(12) United States Patent
Gee et al.

(10) Patent No.: US 11,164,196 B1
(45) Date of Patent: Nov. 2, 2021

(54) TECHNIQUES FOR LEAD SCORING

(71) Applicant: Vivint, Inc., Provo, UT (US)

(72) Inventors: Ryan Gee, Cedar Hills, UT (US); David Jones, Lehi, UT (US); Nicholas Rosenvall, Alpine, UT (US)

(73) Assignee: Vivint, Inc., Provo, UT (US)

( * ) Notice: Subject to any disclaimer, the term of this patent is extended or adjusted under 35 U.S.C. 154(b) by 72 days.

(21) Appl. No.: 16/398,235

(22) Filed: Apr. 29, 2019

(51) Int. Cl.
  *G06Q 10/00* (2012.01)
  *G06Q 30/02* (2012.01)
  *G06Q 20/32* (2012.01)
  *G06Q 10/06* (2012.01)
  *G06Q 10/04* (2012.01)

(52) U.S. Cl.
  CPC ......... *G06Q 30/0202* (2013.01); *G06Q 10/04* (2013.01); *G06Q 10/0639* (2013.01); *G06Q 20/3224* (2013.01)

(58) Field of Classification Search
  None
  See application file for complete search history.

(56) References Cited

U.S. PATENT DOCUMENTS

| | | | | |
|---|---|---|---|---|
| 6,470,344 | B1* | 10/2002 | Kothuri | G06F 16/2264 707/696 |
| 8,244,566 | B1* | 8/2012 | Coley | G06Q 10/109 705/7.11 |
| 8,839,232 | B2* | 9/2014 | Taylor | G06Q 30/02 717/176 |
| 9,300,801 | B1* | 3/2016 | Warford | G10L 25/63 |
| 10,108,952 | B2* | 10/2018 | Hanson | G06Q 30/016 |
| 10,108,974 | B1* | 10/2018 | Shariff | G06Q 30/0201 |
| 2001/0054064 | A1* | 12/2001 | Kannan | H04M 3/567 709/203 |
| 2002/0059095 | A1* | 5/2002 | Cook | G06Q 10/06311 705/7.32 |
| 2002/0082892 | A1* | 6/2002 | Raffel | G06Q 10/063118 705/7.26 |
| 2003/0135402 | A1* | 7/2003 | Moore | G06Q 10/06311 705/7.13 |
| 2004/0093268 | A1* | 5/2004 | Ramchandani | G07C 9/28 705/14.13 |
| 2005/0097000 | A1* | 5/2005 | Freishtat | G06Q 30/0617 705/26.41 |

(Continued)

OTHER PUBLICATIONS

Vincent W. Zheng, Yu Zheng, Xing Xie, Qiang Yang et al. (Collaborative Location and Activity Recommendations with GPS History Data, WWW 2010, Apr. 26-30, 2010, Raleigh, North Carolina). (Year: 2010).*

(Continued)

*Primary Examiner* — Hafiz A Kassim
(74) *Attorney, Agent, or Firm* — Holland & Hart, LLP

(57) ABSTRACT

The described features generally relate to improved methods, systems, and devices for techniques for lead scoring. A provider may identify leads (for example, potential customers) who are likely to purchase the products or services. By identifying which people are more or less likely to purchase the products or services, the provider may be able to more efficiently deploy resources and representatives to increase sales revenue for the products or services. The lead may be assigned a lead score, where the lead score may indicate a probability that the lead will purchase the good, product, or service.

18 Claims, 10 Drawing Sheets

(56) References Cited

U.S. PATENT DOCUMENTS

| | | | |
|---|---|---|---|
| 2005/0192831 A1* | 9/2005 | Ellison | G06Q 10/00 705/7.42 |
| 2006/0242154 A1* | 10/2006 | Rawat | G06F 16/168 |
| 2007/0100684 A1* | 5/2007 | Gartner | G06Q 10/06375 705/7.29 |
| 2007/0156425 A1* | 7/2007 | Keck | G06Q 10/04 705/7.25 |
| 2007/0233559 A1* | 10/2007 | Golec | G06Q 30/02 705/35 |
| 2007/0233560 A1* | 10/2007 | Golec | G06Q 30/02 705/7.42 |
| 2009/0048859 A1* | 2/2009 | McCarthy | G06Q 30/02 705/346 |
| 2009/0192918 A1* | 7/2009 | Hood | G06Q 30/02 705/26.1 |
| 2009/0222304 A1* | 9/2009 | Higgins | G06Q 30/02 705/14.16 |
| 2009/0248492 A1* | 10/2009 | Lloyd | G06Q 30/02 705/7.29 |
| 2010/0017234 A1* | 1/2010 | Stephens | G06Q 40/08 705/4 |
| 2010/0121684 A1* | 5/2010 | Morio | G06Q 10/06311 705/7.13 |
| 2011/0246258 A1* | 10/2011 | Cragun | G06Q 10/103 705/7.31 |
| 2011/0258067 A1* | 10/2011 | Rowell | G06Q 30/06 705/26.2 |
| 2011/0288962 A1* | 11/2011 | Rankin, Jr. | G06Q 30/02 705/27.1 |
| 2012/0066025 A1* | 3/2012 | Quinn | G06Q 10/0637 705/7.31 |
| 2012/0078742 A1* | 3/2012 | Oleen | G06Q 30/0601 705/26.1 |
| 2012/0203584 A1* | 8/2012 | Mishor | G06Q 30/02 705/7.11 |
| 2012/0265622 A1* | 10/2012 | Ramchandani | G06Q 30/0222 705/15 |
| 2013/0253981 A1* | 9/2013 | Lipka | G06Q 30/0201 705/7.29 |
| 2013/0262528 A1* | 10/2013 | Foit | G06Q 30/06 707/805 |
| 2013/0268468 A1* | 10/2013 | Vijayaraghavan | G06N 20/00 706/12 |
| 2014/0032261 A1* | 1/2014 | Kotak | G06Q 30/0202 705/7.29 |
| 2014/0180790 A1* | 6/2014 | Boal | G06Q 30/0211 705/14.42 |
| 2014/0337078 A1* | 11/2014 | Sylvester | G06Q 30/0639 705/7.18 |
| 2015/0019287 A1* | 1/2015 | Sacco | G06Q 30/0202 705/7.31 |
| 2015/0051835 A1* | 2/2015 | Jung | G06F 3/0421 701/533 |
| 2015/0066442 A1* | 3/2015 | Pryor | G06Q 10/10 703/1 |
| 2015/0088610 A1* | 3/2015 | Bayles | G06Q 30/0205 705/7.34 |
| 2015/0112755 A1* | 4/2015 | Potdar | G06Q 30/0201 705/7.29 |
| 2015/0112756 A1* | 4/2015 | Subramanian | G06Q 30/0201 705/7.29 |
| 2015/0112764 A1* | 4/2015 | Augustine | G06Q 30/0202 705/7.31 |
| 2015/0120386 A1* | 4/2015 | Sherman | G06Q 50/01 705/7.31 |
| 2015/0154524 A1* | 6/2015 | Borodow | G06Q 10/06313 705/7.23 |
| 2015/0264173 A1* | 9/2015 | Diana | H04M 3/5191 379/93.02 |
| 2015/0363737 A1* | 12/2015 | Fairbanks | G06Q 20/202 705/7.39 |
| 2016/0098731 A1* | 4/2016 | Hicken | G06Q 30/0201 705/7.29 |
| 2016/0353256 A1* | 12/2016 | Chao | H04W 4/08 |
| 2016/0358193 A1* | 12/2016 | Yunes | G06Q 30/0202 |
| 2017/0011349 A1* | 1/2017 | Jones-McFadden | G06F 3/04842 |
| 2017/0093967 A1* | 3/2017 | Grosz | H04L 51/32 |
| 2017/0300860 A1* | 10/2017 | Cragun | G06Q 10/063118 |
| 2017/0352006 A1* | 12/2017 | Yu | G06Q 10/1095 |
| 2018/0033015 A1* | 2/2018 | Opalka | G06K 9/00228 |
| 2018/0101797 A1* | 4/2018 | Mueller | G06Q 10/06393 |
| 2018/0191903 A1* | 7/2018 | Yokel | H04M 3/5191 |
| 2018/0192244 A1* | 7/2018 | Deluca | H04L 67/18 |
| 2018/0341886 A1* | 11/2018 | Flint | G06Q 10/0631 |

OTHER PUBLICATIONS

Johannes Kröckel and Freimut Bodendorf et al. (Customer Tracking and Tracing Data as a Basis for Service Innovations at the Point of Sale, 2012 Service Research and Innovation Institute Global Conference). (Year: 2012).*

* cited by examiner

TECHNIQUES FOR LEAD SCORING

BACKGROUND

The following relates generally to systems and data processing, and more specifically to techniques for lead scoring.

A platform (i.e., a computing platform) may be employed by many users to store, manage, and process data using a shared network of remote servers. Users may develop applications on the platform to handle the storage, management, and processing of data. In some cases, the platform may utilize a database system. Users may access the platform using various user devices (e.g., desktop computers, laptops, smartphones, tablets, or other computing systems, etc.).

In some examples, the platform may support sales, services, marketing, community, analytics, and applications. A user may utilize the platform to help manage services, goods, or products provided to the user by a provider. For example, managing services provided by the provider may include analyzing data, storing and preparing communications, tracking opportunities, and tracking sales.

SUMMARY

The described features generally relate to improved methods, systems, and devices for techniques for lead scoring. Scoring a lead refers to determining how likely a potential customer is to purchase a product or service when it is offered by a provider. The provider may provide products or services to customers through one or more representatives and/or entities. A provider may wish to identify potential customers (e.g., leads) who are likely to purchase the products or services. By identifying which potential customers are more or less likely to purchase the products or services the provider may be able to more efficiently deploy resources and representatives to increase sales revenue for the products or services.

The provider may use techniques for scoring a lead in order to identify a likelihood that a lead will purchase a product or a service. The lead may be a potential customer, such as an individual who expresses interest in the product or service after learning about them from a representative associated with the provider. The lead may be assigned a lead score, where the lead score may be indicative of a probability that the lead will wish to purchase the good, product, or service.

A method is described. The method may include identifying a location of a person to receive a product or service based on an interaction between the person and a setting representative of the product or service, determining a proximity of a closing representative to the person based on identifying the location of the person, determining a score associated with the person to receive the product or service based on information associated with the setting representative, information associated with the closing representative, and the proximity of the closing representative, and outputting the score to a computing device.

An apparatus is described. The apparatus may include a processor, memory in electronic communication with the processor, and instructions stored in the memory. The instructions may be executable by the processor to cause the apparatus to identify a location of a person to receive a product or service based on an interaction between the person and a setting representative of the product or service, determine a proximity of a closing representative to the person based on identifying the location of the person, determine a score associated with the person to receive the product or service based on information associated with the setting representative, information associated with the closing representative, and the proximity of the closing representative, and output the score to a computing device.

Another apparatus is described. The apparatus may include means for identifying a location of a person to receive a product or service based on an interaction between the person and a setting representative of the product or service, determining a proximity of a closing representative to the person based on identifying the location of the person, determining a score associated with the person to receive the product or service based on information associated with the setting representative, information associated with the closing representative, and the proximity of the closing representative, and outputting the score to a computing device.

A non-transitory computer-readable medium storing code is described. The code may include instructions executable by a processor to identify a location of a person to receive a product or service based on an interaction between the person and a setting representative of the product or service, determine a proximity of a closing representative to the person based on identifying the location of the person, determine a score associated with the person to receive the product or service based on information associated with the setting representative, information associated with the closing representative, and the proximity of the closing representative, and output the score to a computing device.

In some examples of the method, apparatuses, and non-transitory computer-readable medium described herein, the score may be based on information associated with the person that includes information related to a demographic characteristic, a financial characteristic, a purchase history, a preference associated with the product or service, a consumer interest, personally identifying information, financial information, a use history of the product or service, contact information, a credit history, a qualification, or a combination thereof.

In some examples of the method, apparatuses, and non-transitory computer-readable medium described herein, the interaction between the person and the setting representative includes the setting representative identifying that the person may be interested in the product or service.

Some examples of the method, apparatuses, and non-transitory computer-readable medium described herein may further include operations, features, means, or instructions for determining a second proximity of the setting representative to the person, where identifying the location of the person may be based on determining the second proximity of the setting representative with the person.

Some examples of the method, apparatuses, and non-transitory computer-readable medium described herein may further include operations, features, means, or instructions for determining a first score for the setting representative, where determining the score may be based on determining the first score.

In some examples of the method, apparatuses, and non-transitory computer-readable medium described herein, determining the first score for the setting representative further may include operations, features, means, or instructions for identifying a number of leads set for the setting representative based on a lead-setting history of the setting representative, identifying a number of leads closed associated with the leads set for the setting representative based on the lead-setting history of the setting representative, and determining a ratio of the number of leads set to the number of leads closed for the setting representative.

Some examples of the method, apparatuses, and non-transitory computer-readable medium described herein may further include operations, features, means, or instructions for comparing the ratio of the number of leads set to the number of leads closed for the setting representative with an average ratio, where the average ratio may be a ratio of an average number of leads set to an average number of leads closed for a set of representatives, where determining the first score may be further based on the comparison.

In some examples of the method, apparatuses, and non-transitory computer-readable medium described herein, the first score may be increased if the ratio of the number of leads set to the number of leads closed for the setting representative may be greater than the average ratio or decreased if the ratio of the number of leads set to the number of leads closed for the setting representative may be less than the average ratio.

Some examples of the method, apparatuses, and non-transitory computer-readable medium described herein may further include operations, features, means, or instructions for identifying that a first subset of the lead-setting history includes a number of successful lead sets higher than a threshold number of successful lead sets, where determining the first score may be further based on a success weighting factor.

Some examples of the method, apparatuses, and non-transitory computer-readable medium described herein may further include operations, features, means, or instructions for receiving, from the setting representative, at least one type of information indicating that the person may be present with the setting representative, and identifying a second location of the setting representative, where identifying the location of the person may be based on the second location of the setting representative and receiving the information that the person may be present with the setting representative.

Some examples of the method, apparatuses, and non-transitory computer-readable medium described herein may further include operations, features, means, or instructions for weighting information associated with the person received by the setting representative based on types of the information, and determining an intent score for the person based on weighting the information based on the types of the information, where the score may be based on the intent score.

In some examples of the method, apparatuses, and non-transitory computer-readable medium described herein, the types of the information includes a first type of identifying information and a second type of identifying information, where determining the intent score further may include operations, features, means, or instructions for applying a first weighting factor to the first type of identifying information, and applying a second weighting factor to the second type of identifying information, where the second weighting factor may be different than the first weighting factor.

Some examples of the method, apparatuses, and non-transitory computer-readable medium described herein may further include operations, features, means, or instructions for determining a lead-closed history of the closing representative, where determining the score may be based on the lead-closed history.

In some examples of the method, apparatuses, and non-transitory computer-readable medium described herein, determining the score further may include operations, features, means, or instructions for adjusting a first score associated with the setting representative using a first weighting factor, adjusting the proximity using a second weighting factor, and adjusting a second score associated with the person using a third weighting factor.

Some examples of the method, apparatuses, and non-transitory computer-readable medium described herein may further include operations, features, means, or instructions for identifying a subset of a set of representatives based on a proximity of each representative of the subset to the person, the subset including at least the closing representative, determining second scores for each representative in the subset based on the proximity of each representative in the subset to the person and information associated with each representative in the subset, comparing the second scores to determine a highest second score of the second scores, and selecting the closing representative from the subset based on the second score of the closing representative being the highest second score.

In some examples of the method, apparatuses, and non-transitory computer-readable medium described herein, outputting further may include operations, features, means, or instructions for displaying the score on a display of the computing device.

Certain examples of the present disclosure may include some, all, or none of the above advantages or features. One or more other technical advantages or features may be readily apparent to those skilled in the art from the figures, descriptions, and claims included herein. Moreover, while specific advantages or features have been enumerated above, various examples may include all, some, or none of the enumerated advantages or features.

Further scope of the applicability of the described methods and systems will become apparent from the following detailed description, claims, and drawings. The detailed description and specific examples are given by way of illustration only, since various changes and modifications within the spirit and scope of the description will become apparent to those skilled in the art.

DETAILED DESCRIPTION

Figure 1:
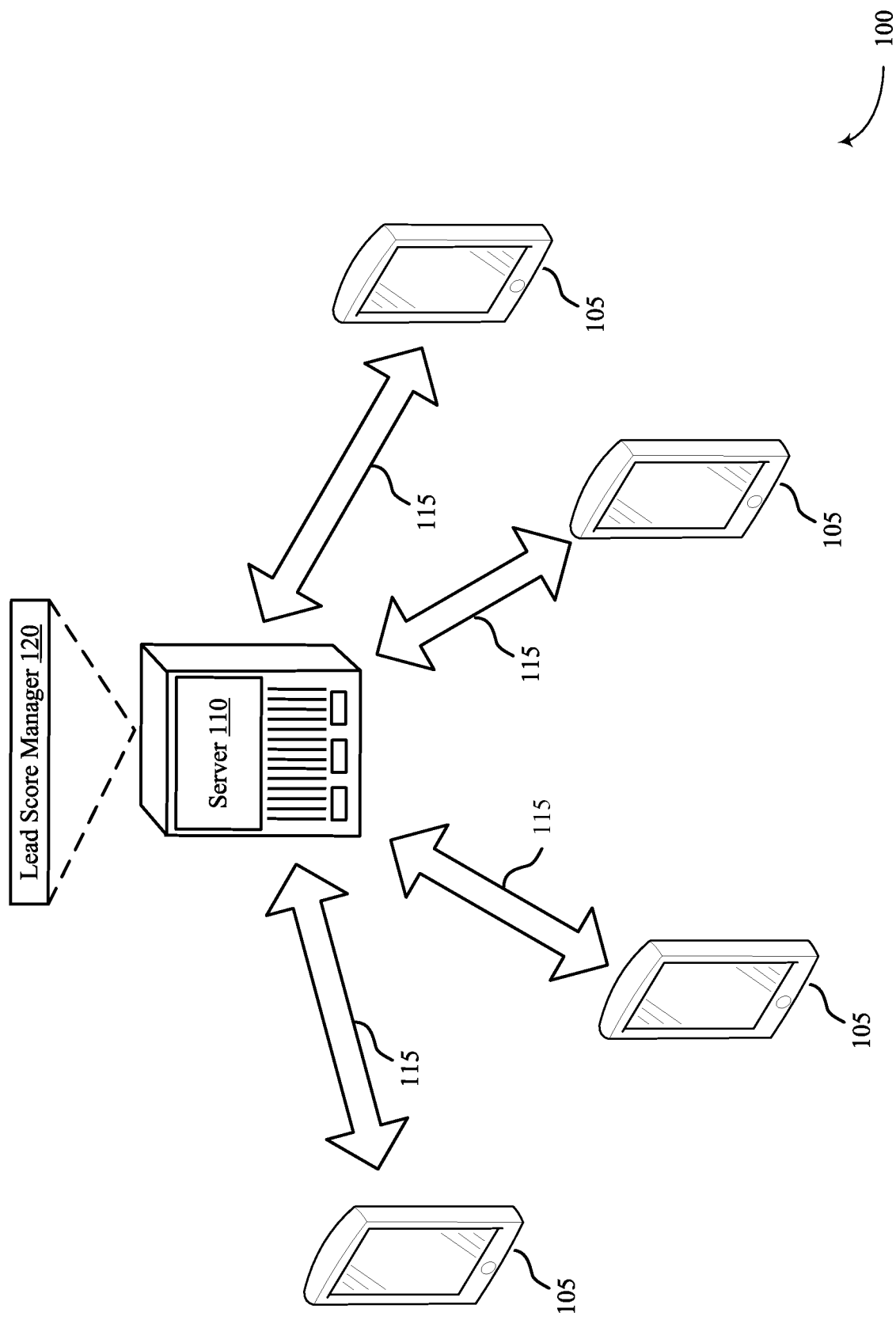
FIG. 1 illustrates an example of a system that supports techniques for lead scoring in accordance with aspects of the present disclosure.

A provider may provide products or services to customers through one or more representatives and/or entities. While some customers may directly seek out the provider to purchase products or services, other potential customers may not. For example, the potential customer may be unaware of products or services that the provider offers or do not seek out the provider for some other reason. To reach these potential customers, the provider may send out its representatives to contact the potential customers to offer the products or services, either in person or via telephone, email, etc. However, if the provider does not know which individuals in an area are likely to be potential customers, the representatives may have to contact a large number of individuals in the area in hopes of identifying potential customers, which may be inefficient.

To more efficiently identify potential customers, the provider may obtain leads from other providers or representatives in the area. The other providers may be other entities that provide different products or services. In some cases the other providers may have customers who are interested in the products or services offered by the provider. The providers may be associated with each other and jointly use a sales platform in order offer products or services to customers of the other providers or to connect the customers with the providers.

As an example, a representative of one of the other providers may be on-site at a home of a customer for installation, maintenance, repair, or upgrade of an existing product or service. While the representative is at the home, they may learn the customer is interested in a product or service offered by the provider, either because the customer expresses interest or by some other means. The representative may inform the customer of the products or services offered by the provider, and offer to have a representative of the provider contact the customer and give the customer the opportunity to learn more about or purchase the product or service offered by the provider. If the customer agrees, the customer then becomes a "lead" for the provider, because the customer is now a potential customer of the provider. By originating the lead, the representative becomes a lead setter or a lead originator, and may be referred to as a "setting representative." The setting representative may identify the lead for the provider and provide information about the lead to the provider using the sales platform. In other words, the setting representative "sets" the lead.

The provider may send a representative to follow up on the lead set by the setting representative. The representative sent by the provider may be referred to as a "closing representative" because they may close a deal for the potential customer. The closing representative may attempt to "close" the lead by contacting the potential customer identified by the setting representative. A closing representative may close the lead by obtaining a sale, contract, subscription, etc., for the product or service. If the closing representative does not close the lead by obtaining a sale, contract, subscription, etc., that lead is considered not to be closed by the closing representative but may be counted as an attempted lead close.

To more efficiently determine where to deploy resources and representatives and thereby increase sales revenue, the providers using the sales platform may use a lead scoring manager to "score" leads by determining how likely a potential customer is to purchase a product or service when it is offered by a provider or other entity. The lead scoring manager may be incorporated into a computing device associated with the sales platform, such as a server, a personal computer, a mobile device, or the like.

To score a lead with as much accuracy as possible, the lead scoring manager may use a combination of multi-dimensional factors when scoring the lead. There are many factors that may influence how likely a potential costumer is to actually proceed with a purchase, and the lead scoring manager may take these into account to determine the lead score for each lead and potential closing representative. For example, a lead that is set in person may be more likely to be closed than a lead that is not set in person (e.g., a lead may be set from a call center). A lead may be more likely to close if the lead is set personably. The lead scoring manager may calibrate the lead score to reflect this. Further, a lead may be more likely to purchase the product or service if the closing representative is local and can attempt to contact the lead shortly after it is identified. The lead scoring manager may determine locations of the lead, the setting representative, and the closing representative, and score the lead based on the proximity of the setting and closing representatives to the lead.

The lead score may also reflect an intent of the lead to be closed, or how seriously the lead intends to purchase the product or service. Purchasing the product or service may include a number of steps within a sales funnel, and the number of steps the lead completes may directly correlate to the intent of the lead to purchase the product or service In order to gauge the intent of the lead to purchase the product or service, the setting representative may request that the lead provide information that the setting representative can send to the lead scoring manager. The lead scoring manager may score the lead based on the amount of information and the types of information the lead provides. As the lead completes more steps in the sales funnel and provides additional information, the lead may increase their intent to purchase the product or service. For example, if the lead provides personally identifiable information, the lead scoring manager may determine the intent to purchase is higher than if the lead only provides contact information (e.g., a telephone number, an email address, etc.). The lead scoring manager may also determine the intent to purchase based on historical data or past interactions with the lead, which may be provided by the setting representative.

Each step in the sales funnel that is completed may be given a weight based on difficulties associated with the setting representative completing the step. For example, if a step in the sales funnel requests the setting representative to qualify the lead and determine a credit history of the lead, that step may have a higher barrier to overcome because the setting representative ask for and receives personally identifiable information. When the personally identifiable information is collected, it may show the lead has more intent to purchase the produce or service. Each step in the sales funnel that is completed may be aggregated based on the weight of that step to determine the intent of the lead to purchase the product or service.

The lead score may also reflect who the lead is, and how other characteristics of the lead will affect the likelihood that the lead will eventually purchase the product or service. For example, when scoring the lead, the lead scoring manager may consider factors such as a purchase history of the lead, demographic characteristics associated with the lead, financial information associated with the lead, preferences of the lead, a use history of the product or service, a credit history of the lead, an ability of the lead to pay for the product or service, complimentary interests of the lead, and the like.

The lead score may also consider the origin of the set lead (i.e., the setting representative), and how successful the setting representative has been with previously set leads. For example, if the setting representative has a history of setting leads that are successfully closed at a higher rate than average, the lead score may be higher than it would be otherwise. Similarly, the lead score may also be calibrated to reflect how successful the closing representative has historically been at closing leads.

The lead scoring manager may determine the lead score based on any or all of the scoring dimensions listed above, as well as additional scoring dimensions. The combination of the multi-dimensional lead factors, as well as the locations of the lead, the setting representative, and the closing representative, may be used as a basis for determining the lead score, which may be indicative of the likelihood that the lead will be successfully closed. The lead scoring manage may give each scoring dimension a weight and aggregate the scoring dimensions to determine the lead score. In some examples, the lead scoring manager may adjust scoring dimensions based on weighting factors associated with at least some of the scoring dimensions. The provider may adjust the weighting factors based on preferences, past experience, based on a scoring model, or for other reasons. The lead scoring manager may determine the lead score based on a sum of the adjusted scoring dimensions, a weighted sum, or a ratio of the sum to the weighted sum.

Once the lead score is determined, it may be communicated to various representatives of the providers. The lead score may be a multi-dimensional lead score, and may be communicated to the closing representative. For example, the lead score may be transmitted to a device operated by the closing representative. The closing representative may view the lead score to determine whether and when the closing representative should act on the lead and attempt to close the lead.

In some examples, the closing representative may use the lead score to prioritize leads to act on first. The closing representative may determine to act on leads with high lead scores in order to maintain a high efficiency and a high rate of successfully closing leads. For example when the closing representative determines the lead score is high (e.g., above a threshold score), the closing representative may determine the lead is a "hot" lead. The closing representative may wish to follow up with the hot lead quickly to increase a probability the lead will be successfully closed.

The lead score may also be transmitted to a device operated by the setting representative. The setting representative may view the lead score to determine how likely it is that the lead will be acted on quickly. In some examples, the setting representative may decide to follow up with the lead on subsequent visits or in subsequent contact opportunities to attempt to improve the lead score so that it may be successfully closed.

Aspects of the disclosure are initially described in the context of an environment supporting scoring leads associated with a service provider, a good, a product, or a service, or a combination thereof. Additional aspects of the disclosure are described with respect to process flows. Aspects of the disclosure are further illustrated by and described with reference to apparatus diagrams, system diagrams, and flowcharts that relate to techniques for lead scoring.

FIG. 1 illustrates an example of a system 100 that supports techniques for lead scoring in accordance with various aspects of the present disclosure. The system 100 may include one or more devices 105 and a server 110. The devices 105 and the server 110 of the system 100 may communicate over a communication system or network. In some examples, the communication system may be a wired communication system such as Ethernet, may be a wireless communication system such as a Long Term Evolution (LTE) network, an LTE-Advanced (LTE-A) network, an LTE-A Pro network, or a New Radio (NR) network, or a combination thereof. In some examples, the communication system may be the Internet, an intranet, a personal area network, a local area network (LAN), a wide area network (WAN), a virtual network, a telecommunications network implemented as a wired network and/or wireless network, and the like.

The device 105 may be an example of a user device, such as a server, a smartphone, or a laptop. In other examples, the device 105 may be a desktop computer, a tablet, a sensor, or another computing device or system capable of generating, analyzing, transmitting, or receiving communications. In some examples, the device 105 may be operated by a user that is a representative of a business, an enterprise, a non-profit, a startup, or any other organization type. The device 105 may access the server 110 via a communication link 115 to store, manage, and process data associated with the communications, opportunities, purchases, sales.

A provider may provide services to customers through one or more representatives and/or entities. The device 105 may be associated with an entity that provides products or services to a customer. For example, the device 105 may be associated with the provider or a representative of the provider. For example, the service may be sold to the customer or installed at a premise associated with the customer. In some examples, the device 105 may be associated with a representative who sets the lead. The representative who sets the lead may also be referred to as a lead setter, a lead originator, or a setting representative. Another device 105 may be associated with a representative who closes the lead. The representative who closes the lead may also be referred to as a lead closer or closing representative.

A provider may wish to identify potential customers who are likely to purchase the services. By identifying which potential customers are more likely to purchase the services and which potential customers are less likely to do so, a provider may be able to more efficiently deploy representatives to provide the services and increase sales revenue.

The server 110 may be an example of a single server or a server cluster, or may be an example of one or more software modules implemented within other devices. The server 110 may be an example of a public or private network. For example, the server 110 may offer an on-demand database service to the device 105. In some cases, the server 110 may be an example of a multi-tenant database system. In this case, the server 110 may serve multiple devices 105 with a single instance of software. However, other types of systems may be implemented, including—but not limited to—client-server systems, mobile device systems, and mobile network systems. This may include support for sales, service, marketing, community, analytics, and applications.

In some cases, the provider may develop one or more applications to run on the server 110. The server 110 may be implemented using remote servers. In some cases, the remote servers may be located at one or more data centers. The multiple servers may be used for data storage, management, and processing. The server 110 may utilize multiple redundancies for security purposes. In some cases, the data stored at server 110 may be backed up by copies of the data at a different data center.

The server 110 may include a lead scoring manager 120 for determining a lead score based on a number of factors. Each factor may have an associated scoring dimension, and the lead scoring manager 120 may be based on the associated scoring dimensions. The scoring dimensions may include a lead setter scoring dimension, a lead subject scoring dimension, a lead intent scoring dimension, a physical location scoring dimension, etc. The server 110 may transmit the lead score to devices 105 via communication links 115.

It should be appreciated by a person skilled in the art that one or more aspects of the disclosure may be implemented in the system 100 to additionally or alternatively solve other problems than those described above. Furthermore, aspects of the disclosure may provide technical improvements to existing systems or processes as described herein. The description and appended drawings may include examples of technical improvements resulting from implementing aspects of the disclosure, and accordingly do not represent all of the technical improvements provided within the scope of the claims.

Figure 2:
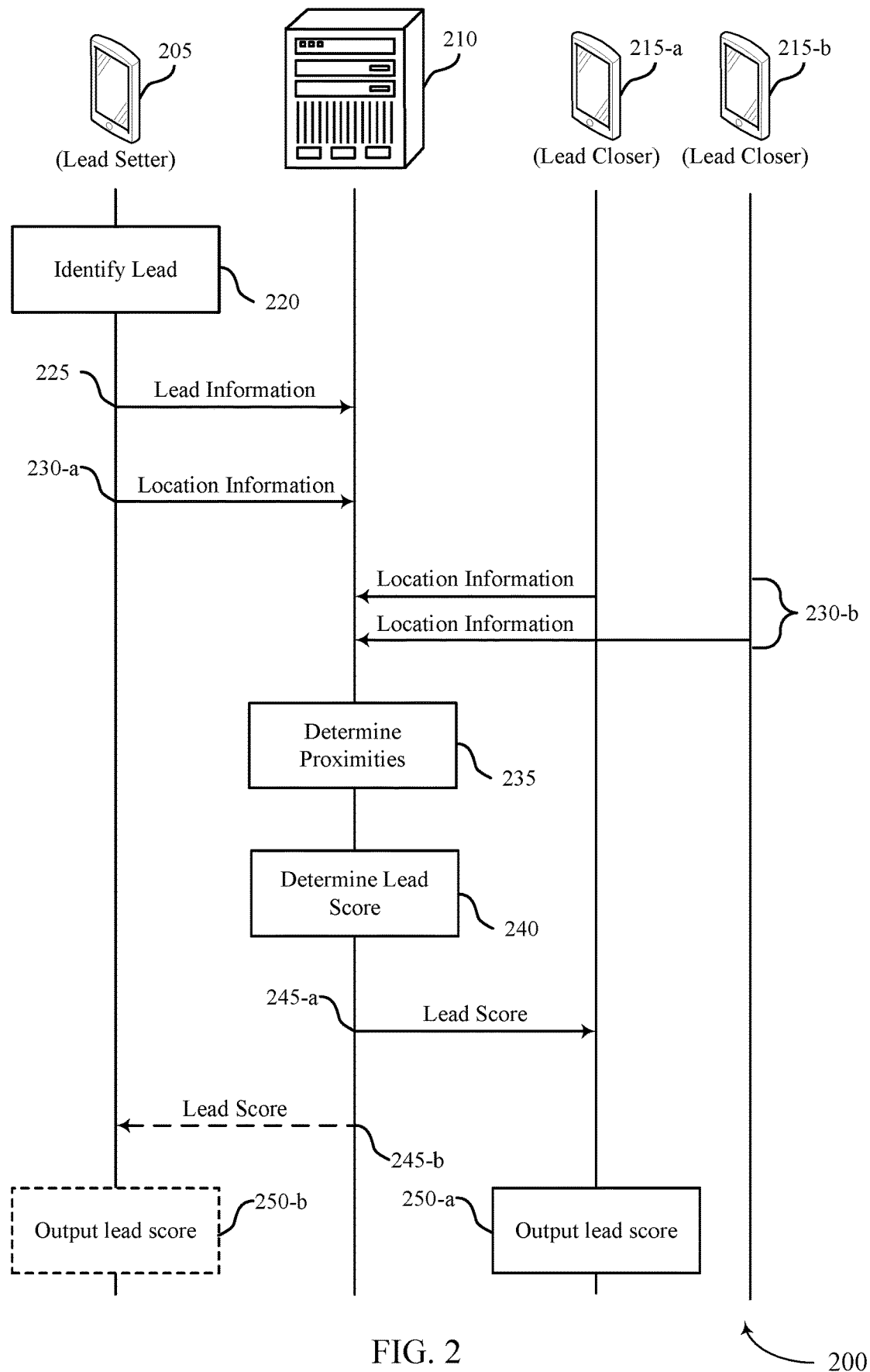
FIG. 2 illustrates an example of a process flow that supports techniques for lead scoring in accordance with aspects of the present disclosure.

FIG. 2 illustrates an example of a process flow 200 that supports techniques for lead scoring in accordance with aspects of the present disclosure. The process flow 200 may include a setter device 205, a server 210, and two closer devices 215-*a* and 215-*b* (collectively referred to herein as closer devices 215). The server 210 may be an example of the server 110 as described with reference to FIG. 1. The setter device 205 and the closer devices 215 may be examples of the devices 105 as described with reference to FIG. 1. Alternative examples of the following may be implemented, where some steps are performed in a different order than described, not performed at all, steps may include additional features not described below, or further steps may be added. In some cases, the process flow 200 may include more or fewer devices as those illustrated.

At 220, the setter device 205 may determine information about a potential lead. A setting representative may operate the setter device 205. A setting representative may be a representative or employee of an entity that provides products or services. The entity may be partnered with one or more other entities that provide other products or services. The entities may have a business agreement or be associated with each other in a partnership or other type of business arrangement. The entities may jointly use a sales platform in order to connect customers to the other entities or to offer products or services to customers of other companies using the sales platform. In some examples, the different entities may serve part, or all, of the same customer base. As used herein, the term partnership is meant to indicate some sort of association with between the two or more entities, and does not necessarily indicate a legal partnership between the entities. Furthermore, as used herein, the terms entity, company, and provider may be used interchangeably.

The setting representative may identify a lead and provide information about the lead to the sales platform. For example, the setting representative may work for a company that provides home automation and security solutions. The company may be partnered with other companies, such as a utility company or a network service provider. The setting representative may be on-site at a home of a customer for installation, maintenance, repair, or upgrade of a home security and automation system for the customer. While the setting representative is at the home, the customer may express interest in a product or service offered by a partner of the home security and automation company. For example, the customer may express that they would like to have a satellite network system installed by the network service provider. The customer may have already known about the satellite network system or the setting representative may have informed the customer about it. The customer then becomes a lead for the network service provider, because the customer of the home automation and security company is now a potential customer for the network service provider.

The setting representative is a lead setter because they identify the potential lead to the partnering entity. In other words, the setting representative sets the lead. The setting representative may send information about the lead to the partnering entity through the sales platform via the server 210. The information about the lead may be information the setting representative already had about the lead or obtains about the lead, from the lead in person or electronically. The setting representative may cause the setter device 205 to provide the lead information to the server 210 at 225.

In other examples, the lead may use their own device to send their information to the server 210. For example, the setting representative may provide the lead with a website that contains a form to fill out information regarding themselves and the products or services they are interested in. The lead may access the website with their own user device, enter their own information, and the website may provide the entered information to the server 210.

The lead information may include information about the lead, or about family or housemates of the lead, related to a demographic characteristic, a financial characteristic, a purchase history, a preference associated with the product or service, consumer interests, personally identifying information, financial information, a use history of the product or service, a use history of related products or services, contact information, a credit history, a qualification, and the like.

At 230-*a*, the setter device 205 may send location information to the server 210. The location information received from the setter device 205 may include a location of the setter device 205 (which may be the location of the setting representative). In some examples, the location information may also include a location of the lead. The location of the lead and the location of the setter device 205 may be determined based on information from a global navigation satellite system (GNSS), such as the Global Positioning System (GPS). In other examples, the location of the setter device 205 may be determined in other ways, such as triangulation from cell towers or provided via user input. In some examples, the server 210 may infer a location of the lead based on the lead information. Based on the location information from the setter device 205, the server 210 may determine a proximity of the setter device 205 to the lead. In some examples, the server 210 may determine the lead was set in person based on the location of the lead and the location of the setter device 205.

At 230-*b*, the closer devices 215 may provide location information related to the closing representatives to the server 210. A closing representative may receive information about the lead from the sales platform and then act on the received information. For example, the closing representative may work for a company, such as a utility company or a network service provider, that has partnered with the company that provides home automation and security solutions. The closing representative may attempt to "close" the lead by contacting the customer who has expressed interest in a product or service offered by the company for whom the closing representative works. The closing representative is a "lead closer" because they act on the potential lead identified by the setting representative and invite the customer to purchase or subscribe to the product or service. A closing representative may successfully close the lead by obtaining from the customer a sale, contract, subscription, etc., for the product or service.

In some examples, the location information from the closer devices 215 may include a location of a closing representative associated with the closer device 215-a, a location of another closing representative associated with the closer device 215-b, and locations of additional closing representatives. The locations of the closer devices 215 may be determined based on GNSS information, triangulation, or a user input.

At 235, the server 210 may determine a proximity of each closing representative to the lead based on the location information from the setter device 205 and the closer devices 215. For example, the server 210 may compare the location of the lead to the locations of the closing representatives and determine if one or more closing representatives are close to the lead (e.g., in a same neighborhood, within five city blocks, in a nearby housing subdivision, etc.).

At 240, the server 210 may determine a lead score about the lead, setting representative, and the closing representative based on a number of factors. Each factor may have an associated scoring dimension, and the lead score may be based on the associated scoring dimensions. The server 210 may use any or all of the scoring dimensions to determine the lead score. The scoring dimensions may include a lead setter scoring dimension, a lead subject scoring dimension, a lead intent scoring dimension, a physical location scoring dimension, a lead closer scoring dimension, as well as additional scoring dimensions.

The lead setter scoring dimension may be based on information associated with the setting representative operating the setter device 205. In some examples, the lead setter scoring dimension may be based on the proximity of the setting representative to the lead. The lead setter scoring dimension may be further based on a history of the setting representative. The history of the setting representative may include a number of leads previously set by the setting representative. The history of the setting representative may also include a number of leads set by the setting representative that were successfully closed by a closing representative. The history of the setting representative may also include a ratio of the number of leads set to the number of leads closed, which may be determined by comparing the number of leads set by the setting representative to the number of leads set by the setting representative that were successfully closed.

The server 210 may have access to information related to the setting representative and to other setting representatives. For example, the server 210 may have information related to the number of leads set by each setting representative and whether those leads were successfully closed by a closing representative. The server 210 may compare the ratio of the number of leads set to the number of leads closed for the setting representative to an average leads set to leads closed ratio for some or all of the other setting representatives. The server 210 may adjust a score of the lead setter scoring dimension based on this comparison. For example, the server 210 may increase the score of the lead setter scoring dimension if the ratio of the number of leads set to the number of leads closed for the setting representative is greater than the average ratio. Alternatively, the server 210 may decrease the score of the lead setter scoring dimension if the ratio of the number of leads set to the number of leads closed for the setting representative is less than the average ratio. By adjusting the score of the lead setter scoring dimension based comparing the ratio of the number of leads set to the number of leads closed for the setting representative to the average ratio, the lead setter scoring dimension may more accurately identify scoring representatives who are particularly effective at setting leads that have a higher likelihood of being successfully closed.

The server 210 may continue to assess the lead setter scoring dimension based on new leads set by the setting representative over time and whether the leads set by the setting representative are successfully closed. The server 210 may update the history of the setting representative as the setting representative sets new leads and as leads set by the setting representative are successfully closed. If the history of the setting representative includes a number of recent leads successfully set and closed, the server 210 may increase the score of the lead setter scoring dimension based on the recent successfully set and closed leads. The recent successfully set and closed leads may accelerate an increase of the score of the lead setter scoring dimension, which may allow the setting representative to more quickly see improvement in the lead setter scoring dimension associated with the setting representative.

The server 210 may increase the score of the lead setter scoring dimension based on a success weighting factor, where the recent successfully set and closed leads may be given a greater weight than other factors in the history of the setting representative. The server 210 may use the success weighting factor to be more responsive to recent successes of the setting representative, as opposed to determining the score of the lead setter scoring dimension solely based on an overall ratio of the number of leads set to the number of leads closed for the setting representative. For example, if the setting representative recently received relevant training and as a result their lead sets have been more successful than they were before the training, the lead scoring manager may take this into account. By giving a greater weight to recent successfully set and closed leads, the setting representative may be able to more effectively leverage recent successes and more quickly see an increase in the score of the lead setter scoring dimension associated with the setting representative.

The server 210 may determine the lead subject scoring dimension based on a likelihood the lead will actually purchase the service. The server 210 may determine the likelihood based on the information associated with the lead. In some examples, the server 210 may aggregate the lead information to determine the likelihood. Additionally or alternatively, the server 210 may determine the likelihood based on historical data or past interactions with the lead. Some of the factors indicate a greater or lesser likelihood that the lead will actually proceed with the purchase. Additionally, a previous history of using the product or service may be a strong indicator that the lead would use the product or service again. Similarly, a larger income may indicate a higher likelihood of purchasing the product or service than a smaller income. The server 210 may analyze and weight these factors appropriately to generate the lead subject score.

The server 210 may determine the lead intent scoring dimension based on an intent to purchase the product or service, where the intent to purchase may be associated with the lead. The server 210 may determine the intent to purchase based on the types of information provided by the lead. That is, the more information the lead provided about themselves, the more likely that the lead is seriously interested in the product or service. For example, if a lead provides contact information (e.g., a telephone number, an email address, etc.) without additional information, the server 210 may consider the lead to not be very interested in the product or service. However, if a lead provides additional information to the setting representative, such as personally identifiable information, the server 210 may determine the intent to purchase is high. In some examples, the server 210 may aggregate information associated with the lead to determine the intent to purchase. Additionally or alternatively, the server 210 may determine the intent to purchase based on historical data or past interactions with the lead.

The server 210 may determine the physical location scoring dimension based on the location of the lead, the locations of the closing representatives, the location of the setting representative, or a combination thereof. The server 210 may adjust a score of the physical location scoring dimension based on the proximity of the setting representative to the lead and the proximities of the closing representatives to the lead. In some examples, if the server 210 determines the setting representative set the lead in person, the server 210 may increase the score of the physical location scoring dimension on the basis that leads set in person typically have higher closing rates. In some examples, if the server 210 determines that a closing representative is near the lead based on the proximity of the closing representative to the lead, the server 210 may increase the score of the physical location scoring dimension on the basis that leads quickly approached by closing representatives are more likely to close.

In some examples, the server 210 may compare the proximity of each closing representative to a proximity threshold (e.g., one mile, five miles, etc.) to determine if more than one closing representative is within the proximity threshold. The server 210 may determine a proximity score for each closing representative within the proximity threshold based on the proximity of each closing representative to the lead. The server 210 may compare the proximity scores to determine a highest proximity score. Based on comparing the proximity scores, the server 210 may identify which closing representative is closest to the lead. The server 210 may determine a higher lead score the closer the closing representative is to the lead. In the example of FIG. 2, the server 210 determines that the closing representative associated with the closer device 215-*a* has the highest proximity score.

The server 210 may determine the lead closer scoring dimension based on a history of leads closed for each closing representative. A closing representative may close the lead by obtaining a sale, contract, subscription, etc., for the service. If the closing representative does not close the lead by obtaining a sale, contract, subscription, etc., that lead is considered not to be closed by the closing representative but may be counted as an attempted lead close. The server 210 may have access to a history of each closing representative, wherein the history identifies the number of lead closing attempts and the number of successful lead closes for the closing representatives. The more successful a closing representative is, the higher the associated lead closer scoring dimension for that closing representative may be.

In some examples, the server 210 may adjust each scoring dimension based on one or more weighting factors associated with each scoring dimension. For example, a provider may wish to assign a higher value to the physical location scoring dimension and a lower value to additional scoring dimensions, in an effort to encourage nearby closing representatives to follow up on leads quickly, and so may adjust the weighting factors accordingly. The server 210 may determine the lead score based on a sum of the adjusted scoring dimensions, a weighted sum, a ratio of the sum to the weighted sum, etc. The lead score may be indicative of a probability that the lead will actually purchase the service. For example, the lead may be assigned a higher score if there is a higher probability the lead will purchase the service, while the lead may be assigned a lower score if the probability is lower. In some examples, the lead score may include a number, such as a number between zero and one hundred. In some examples, the lead score may be a percent. In other examples, the lead score may be associated with a different scale, such as a color scale (e.g., green indicating a higher score than red), or the like.

At 245-*a*, the server 210 may send the lead score to one or more of the closer devices 215. In some examples, the server 210 may transmit the lead score to the closer device 215-*a* based on determining that the closer device 215-*a* has the highest proximity score. In some examples, the server 210 may transmit the lead score to the closer device 215-*a* based on determining that the closing representative operating the closer device 215-*a* has the highest associated lead closer scoring dimension. At 245-*b*, the server 210 may transmit the lead score to the setter device 205. In some examples, the lead score may be output to a display device associated with the setter device 205. In other examples, the server 210 may send the lead score to the closer device 215-*b*, as well as to other closer devices 215. Each closing representative may have their own lead score, that may be different from other lead scores based on a personal closing history of the closing representative and their proximity to the lead. In some examples, the server 210 may send the lead scores one at a time to the closer devices 215 until one of the closer devices 215 accepts the opportunity to close the lead. The server 210 may sequentially send the lead scores based on the lead score itself, for example, the server 210 may send the highest lead score, then the next highest lead score, then the next highest lead score, and so on, until a closing representative accepts the lead.

At 250, the closer device 215-*a* (or the closer device 215-*a* or the setter device 205) may output the lead score to a display device. The closing representative associated with the closer device 215-*a* may view the lead score on the display device. In some examples, such as when the closing representative determines the lead score is high (e.g., above a threshold score), the closing representative may wish to follow up with the lead quickly to increase the probability that the lead will be successfully closed. In some examples, the server 210 sends a request for acceptance of the lead to the closer device 215-*a*. The closing representative may use the closer device 215-*a* to indicate to the server 210 that the closing representative will attempt to close the lead. In other examples, the closing representative may deny the lead.

The process flow 200 illustrated in FIG. 2 and described herein is one example of how a lead may be scored. The steps of process flow 200 may be performed by other devices than those illustrated performing the steps in FIG. 2. In some examples, some or all of the steps may be performed at the setter device 205, one or more of the closer devices 215, or any combination thereof.

Figure 3:
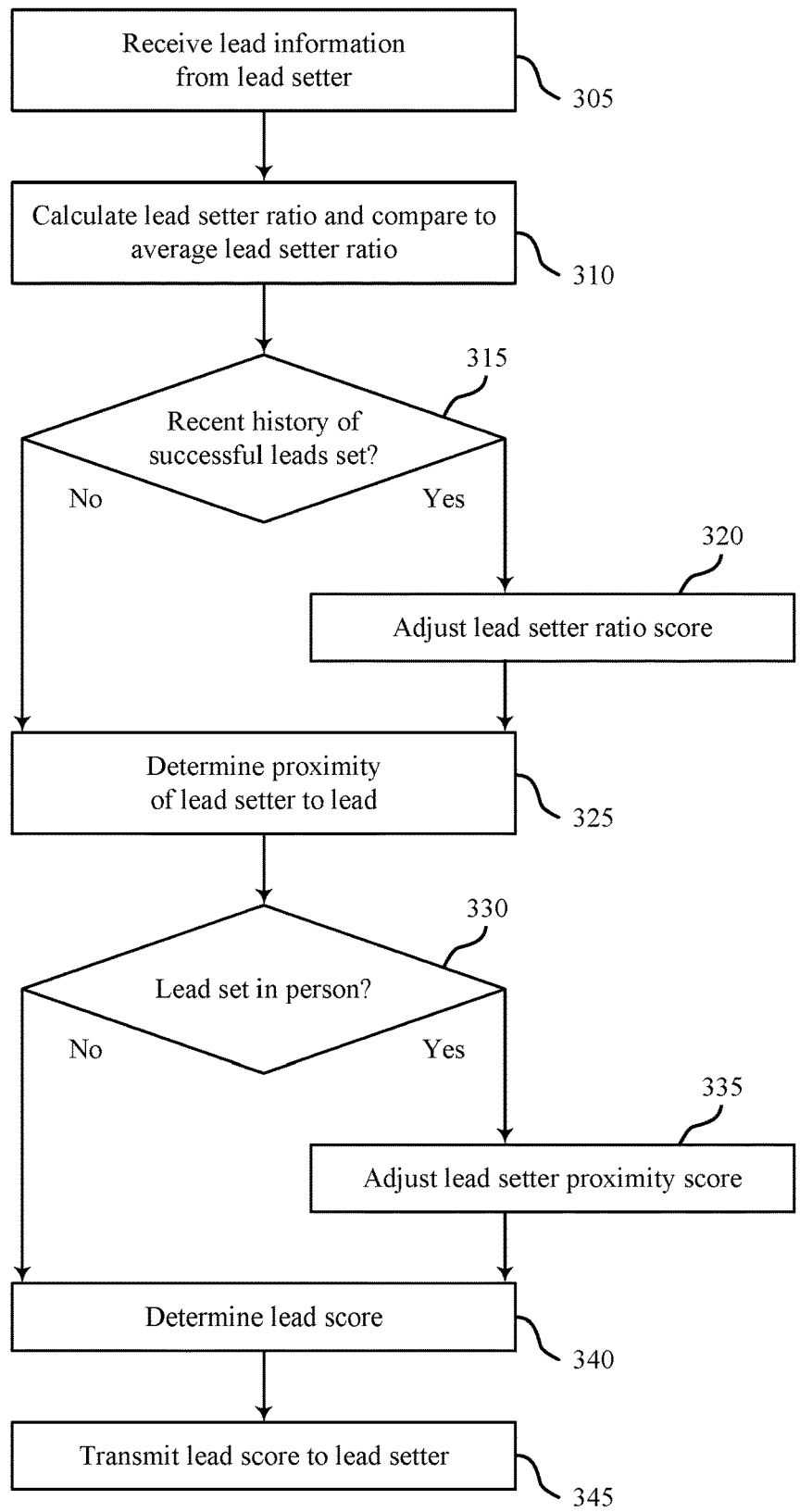
FIG. 3 illustrates an example of a flowchart for determining a lead score in accordance with aspects of the present disclosure.

FIG. 3 shows a flowchart illustrating a method 300 that supports techniques for lead scoring in accordance with aspects of the present disclosure. The operations of method 300 may be implemented by a lead scoring manager or its components as described herein. For example, the operations of method 300 may be performed by a lead scoring manager as described with reference to FIGS. 1, 7, and 8. In some examples, a lead scoring manager may execute a set of instructions to control the functional elements of the lead scoring manager to perform the described functions. Additionally or alternatively, a lead scoring manager may perform aspects of the functions described below using special-purpose hardware.

At 305, the lead scoring manager may receive information associated with a lead from a setting representative. The setting representative may cause a setter device to provide the lead information to the lead scoring manager. The lead information may include information about the lead, or family or housemates of the lead, related to a demographic characteristic, a financial characteristic, a purchase history, a preference associated with the product or service, a consumer interest, personally identifying information, financial information, a use history of the product or service, a use history of related products or services, contact information, a credit history, a qualification, and the like.

At 310, the lead scoring manager may calculate a ratio score associated with the setting representative. The ratio score may be based on a history of the setting representative. The history of the setting representative may include a number of leads previously set by the setting representative. The history of the setting representative may also include a number of leads previously set by the setting representative that were successfully closed by a closing representative. The lead scoring manager may calculate the lead setter ratio, which may be determined by comparing the number of leads set by the setting representative to the number of leads set by the setting representative that were successfully closed.

The lead scoring manager may compare the lead setter ratio of the setting representative to an average leads set to leads closed ratio for a number of other setting representatives. The lead scoring manager may determine the ratio score based on this comparison. For example, the lead scoring manager may determine the ratio score is higher if the ratio of the number of leads set to the number of leads closed for the setting representative is greater than the average ratio. Alternatively, the lead scoring manager may determine the ratio score is lower if the ratio of the number of leads set to the number of leads closed for the setting representative is less than the average ratio.

The lead scoring manager may update the history of the setting representative as the setting representative sets new leads and as leads set by the setting representative are successfully closed. At 315, the lead scoring manager may determine if the history of the setting representative includes a number of recent leads successfully set and closed. If the lead scoring manager determines the history of the setting representative includes a number of recent leads successfully set and closed, the lead scoring manager may adjust the ratio score of the setting representative at 320. For example, the lead scoring manager may increase the ratio score based on the recent successfully set and closed leads. The lead scoring manager may increase the ratio score based on a success weighting factor, where the recent successfully set and closed leads may be given a greater weight than other factors in the history of the setting representative. The lead scoring manager may use the success weighting factor to more quickly respond to recent successes of the setting representative, as opposed to determining the ratio score solely based on an overall ratio of the number of leads set to the number of leads closed for the setting representative. By giving a greater weight to recent successfully set and closed leads, the setting representative may be able to more effectively leverage recent successes and more quickly see an increase in their ratio score.

At 325, the lead scoring manager may determine a proximity of the setting representative to the lead. Location information received from the setter device may include a location of the setter device (which may be the location of the setting representative). In some examples, the location information may also include a location of the lead. The location of the lead and the location of the setter device may be determined based on information from a GNSS. In other examples, the location of the setter device may be determined in other ways, such as triangulation from cell towers or provided via user input. In some examples, the lead scoring manager may infer a location of the lead based on the lead information. Based on the location information from the setter device, the lead scoring manager may determine a proximity of the setter device to the lead. The lead scoring manager may determine a lead setter proximity score based on the proximity of the setter device to the lead.

At 330, the lead scoring manager may determine if the setting representative set the lead in person based on the location of the lead and the location of the setter device. If the lead scoring manager determines the lead was set in person, the lead scoring manager may adjust the lead setter proximity score at 335. For example, the lead scoring manager may determine that a lead may have a higher probability of purchasing the service when the lead is set in person, while the lead may have a lower probability of purchasing the service when the lead is not set in person (e.g., via an electronic communication, from a call center, etc.). The lead scoring manager may increase the lead setter proximity score based on the setting representative setting the lead in person.

At 340, the lead scoring manager may determine a lead score based on the ratio score, the lead setter proximity score, and additional scoring dimensions. In some examples, the lead scoring manager may adjust scoring dimensions based on a weighting factor associated with each scoring dimension. For example, a provider may wish to assign a higher value to the ratio score and a lower value to additional scoring dimensions, in an effort to encourage the setting representative to improve their ratio score, and so may adjust the weighting factors accordingly. The lead scoring manager may determine the lead score based on a sum of the adjusted scoring dimensions, a weighted sum, a ratio of the sum to the weighted sum, etc. The lead score may be indicative of a probability that the lead will actually purchase the service. For example, the lead may be assigned a higher score if there is a higher probability the lead will purchase the service, while the lead may be assigned a lower score if the probability is lower.

At 345, the lead scoring manager may transmit the lead score to the setter device. In some examples, the setter device may output the lead score to a display device so the setting representative may view the lead score.

Figure 4:
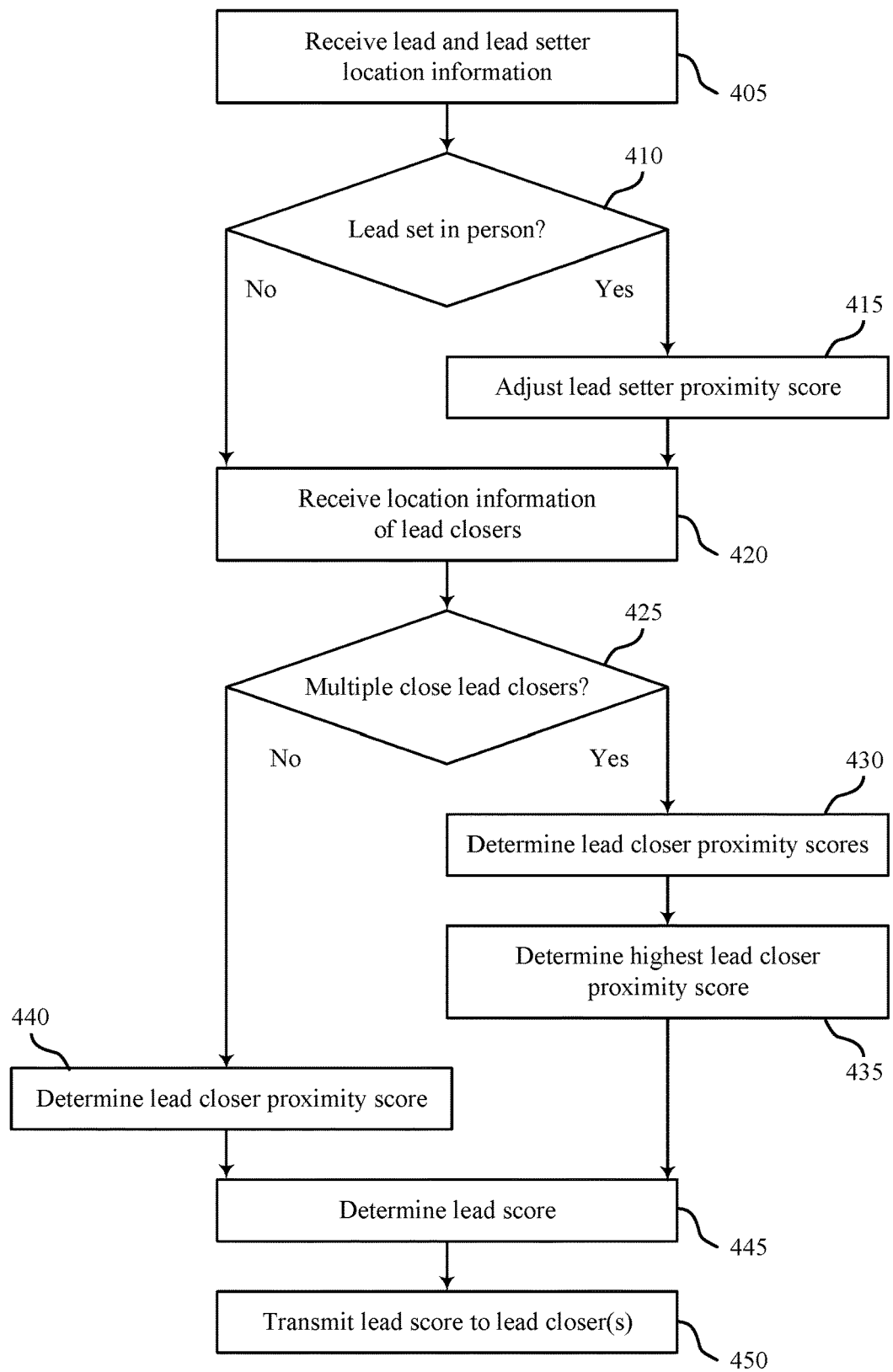
FIG. 4 illustrates an example of a flowchart for determining a lead score based on proximities in accordance with aspects of the present disclosure.

FIG. 4 shows a flowchart illustrating a method 400 that supports techniques for lead scoring in accordance with aspects of the present disclosure. The operations of method 400 may be implemented by a lead scoring manager or its components as described herein. For example, the operations of method 400 may be performed by a lead scoring manager as described with reference to FIGS. 1, 7, and 8. In some examples, a lead scoring manager may execute a set of instructions to control the functional elements of the lead scoring manager to perform the described functions. Additionally or alternatively, a lead scoring manager may perform aspects of the functions described below using special-purpose hardware.

At 405, the lead scoring manager may receive location information and information about the lead from a setter device. The setter device may be operated by a setting representative. The location information received from the setter device may include a location of the setter device and it may also include a location of the lead. The location of the lead and the location of the setter device may be determined based on information from a GNSS, or through other means. In some examples, the lead scoring manager may infer a location of the lead based on additional lead information. Based on the location information from the setter device, the lead scoring manager may determine a proximity of the setter device to the lead. The lead scoring manager may determine a lead setter proximity score based on the proximity of the setter device to the lead.

At 410, the lead scoring manager may determine if the setting representative set the lead in person based on the location of the lead and the location of the setter device. If the lead scoring manager determines the lead was set in person, the lead scoring manager may adjust the lead setter proximity score at 415. For example, the lead scoring manager may determine that a lead may have a higher probability of purchasing the service when the lead is set in person, while the lead may have a lower probability of purchasing the service when the lead is not set in person (e.g., via an electronic communication, from a call center, etc.). The lead scoring manager may increase the lead setter proximity score based on the setting representative setting the lead in person.

At 420, the lead scoring manager may receive location information from one or more closer devices. Each closing device may be operated by a closing representative. In some examples, the location information from the one or more closer devices may include a location of each of the one or more closer devices. The locations of the closer devices may be determined based on GNSS information, triangulation, or a user input, for example. The lead scoring manager may determine a proximity of each closing representative to the lead based on the location information from the setter device and the one or more closer devices. For example, the lead scoring manager may compare the location of the lead to the locations of the closing representatives and determine if one or more closing representatives are close to the lead (e.g., in a same neighborhood, within five city blocks, in a nearby housing subdivision, etc.).

At 425, the lead scoring manager may compare the proximity of each closing representative to a proximity threshold (e.g., one mile, five miles, etc.) to determine if more than one closing representative is within the proximity threshold. If the lead scoring manager determines more than one closing representative is within the proximity threshold, the lead scoring manager may determine a lead closer proximity score for each closing representative within the proximity threshold based on the proximity of each closing representative to the lead at 430. At 435, the lead scoring manager may compare the lead closer proximity scores to determine a highest lead closer proximity score. Based on comparing the lead closer proximity scores, the lead scoring manager may select the closing representative with the highest lead closer proximity score. If the lead scoring manager determines one closing representative is within the proximity threshold, the lead scoring manager may select the closing representative within the proximity threshold and determine a lead closer proximity score for the selected closing representative at 440.

At 445, the lead scoring manager may determine a lead score based on the lead setter proximity score, the lead closer proximity score for the selected lead closer, and additional scoring dimensions. In some examples, the lead scoring manager may adjust scoring dimensions based on a weighting factor associated with each scoring dimension. For example, a provider may wish to assign a higher value to the lead setter proximity score and the lead closer proximity score and a lower value to additional scoring dimensions, in an effort to encourage closing representatives to quickly follow up on nearby leads set in person, and so may adjust the weighting factors accordingly. The lead scoring manager may determine the lead score based at least in part on these different scores and the various factors described herein.

At 450, the lead scoring manager may transmit the lead score to the closer device of the selected closing representative. In some examples, the closer device may output the lead score to a display device so the selected closing representative may view the lead score. In some examples, such as when the selected closing representative determines the lead score is high (e.g., above a threshold score), the selected closing representative may wish to follow up with the lead quickly to increase a probability the lead will be successfully closed.

Figure 5:
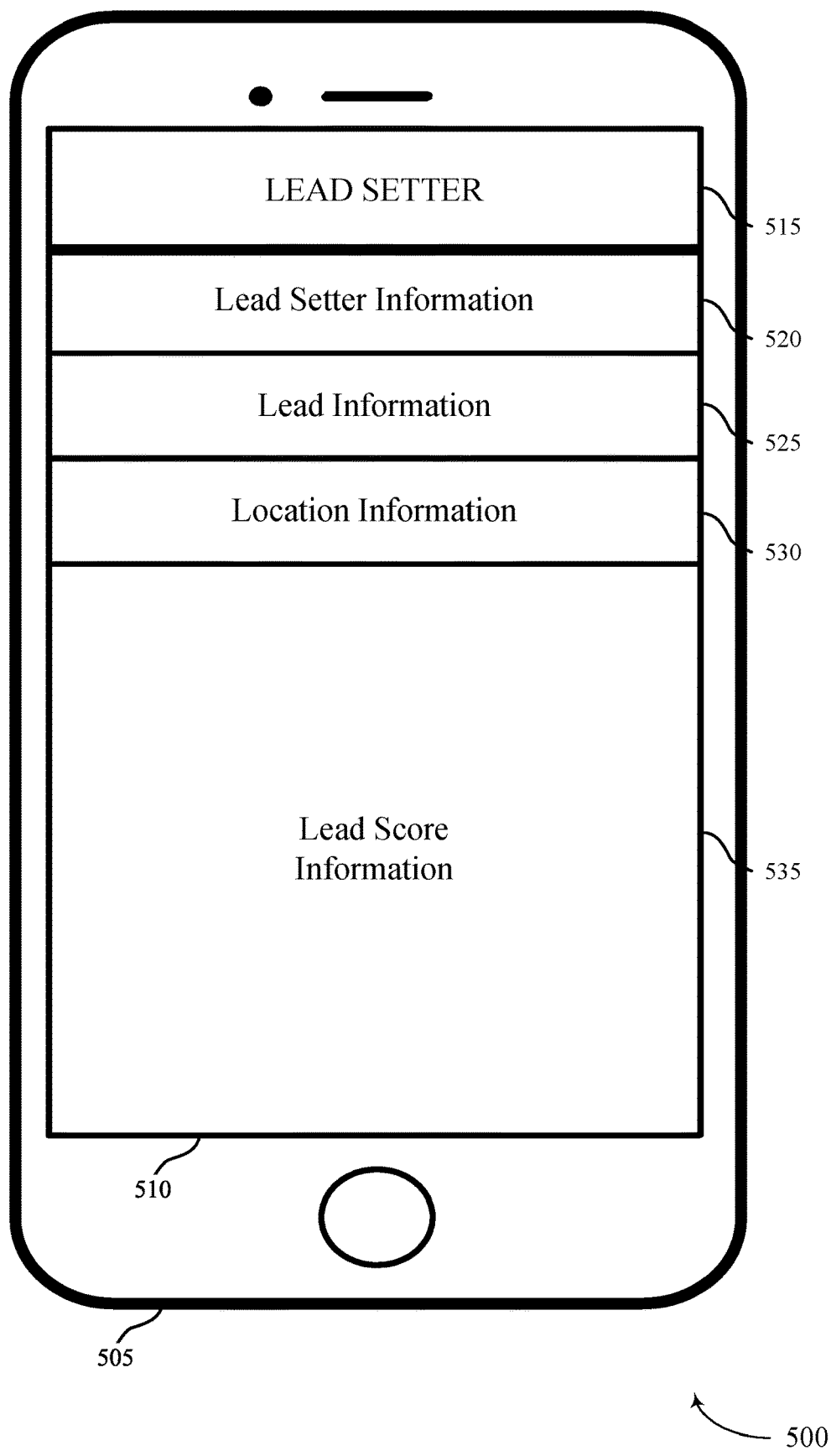
FIG. 5 illustrates an example of a user interface that supports techniques for lead scoring in accordance with aspects of the present disclosure.

FIG. 5 illustrates an example of a user interface 500 that supports techniques for lead scoring in accordance with aspects of the present disclosure. In some examples, the user interface 500 may implement aspects of the system 100. For examples, the user interface 500 may be for an application on a computing device and may enable a setting representative to interact with a lead scoring manager. For example, the device 105 may output the user interface 500 as part of a graphical user interface (GUI) for the sales platform application.

As illustrated, the user interface 500 may be displayed on at least one computing device 505, which may be an example of a device 105 as described with reference to FIG. 1. The user interface 500 may be displayed on a display 510 of the computing device 505. The user interface 500 may also include several fields of information.

The user interface 500 may include a name field 515. The name field 515 may be configured display a name of the setting representative. The user interface 500 may also include a lead setter information field 520. The lead setter information field 520 may be configured to display information regarding a score for the setting representative, such as a lead score or a ratio score. The lead score or the ratio score may be based on a history of the setting representative and may also be based on a comparison of the setting representative with other setting representatives, and may be adjusted according to one or more weighting factors described herein. In other examples, the lead setter information field 520 may indicate one or more of a history of the setting representative, a current successful lead sets streak, a number of leads set, or the like.

The user interface 500 may also include a lead information field 525. The setting representative may select the lead information field 525 to input or view information associated with a lead. The setting representative may cause the computing device 505 to provide the lead information to the lead scoring manager. The lead information may include information about the lead, or family or housemates of the lead, related to a demographic characteristic, a financial characteristic, a purchase history, a preference associated with the product or service, a consumer interest, personally identifying information, financial information, a use history of the product or service, a use history of related products or services, contact information, a credit history, a qualification, and the like.

The user interface 500 may also include a location information field 530. The setting representative may select the location information field 530 to input or view location information. The location information may include a location of the computing device 505. In some examples, the location information may also include a location of the lead.

The user interface 500 may also include a lead score information field 535, which may be configured to display a lead score. The lead scoring manager may determine the lead score based on a number of factors. Each factor may have an associated scoring dimension, and the lead score may be based on the associated scoring dimensions. One or more of the scoring dimensions may be determined based on information associated with the lead and/or the setting representative, such as the ratio score of the setting representative, the proximity of the computing device 505 to the lead, etc. The setting representative may input or view the information associated with the lead and/or the setting representative via the user interface 500. In some examples, the user interface 500 may also include information about the potential closing representatives who may be, or are, responding to the lead set.

Figure 6:
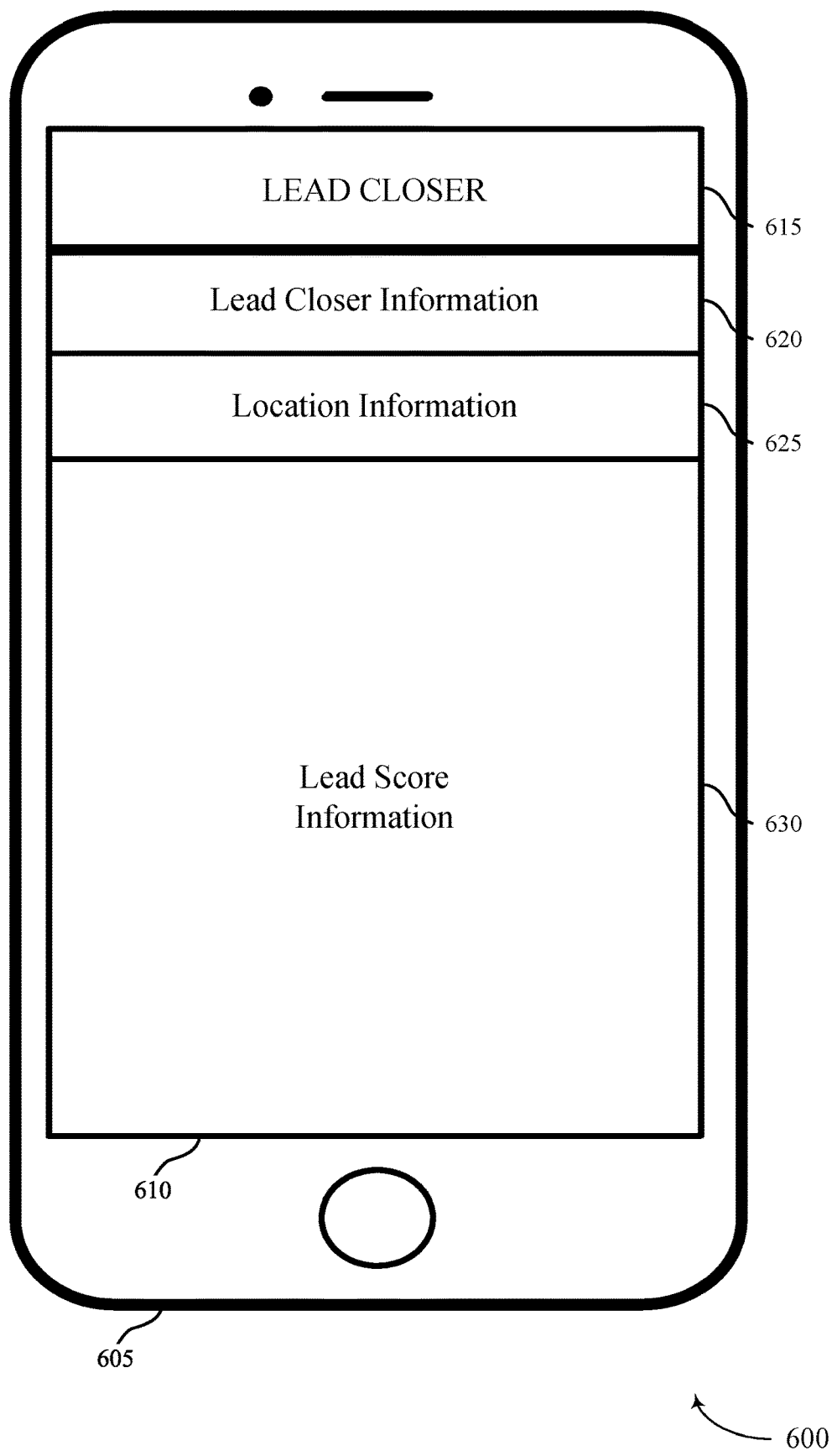
FIG. 6 illustrates an example of a user interface that supports techniques for lead scoring in accordance with aspects of the present disclosure.

FIG. 6 illustrates an example of a user interface 600 that supports techniques for lead scoring in accordance with aspects of the present disclosure. In some examples, the user interface 600 may implement aspects of the system 100. For examples, the user interface 600 may be an application on a computing device (e.g., device 105) and may enable a closing representative to interact with a lead scoring manager.

As illustrated, the user interface 600 may be displayed at least one computing device 605, which may be an example of a device 105 as described with reference to FIG. 1. The user interface 600 may be displayed on a display 610 of the computing device 605. The user interface 600 may also include a name field 615. The name field 615 may be configured display a name of the closing representative.

The user interface 600 may also include a lead closer information field 620. The lead closer information field 620 may be configured to display information associated with the closing representative, such as a history of leads closed for the closing representative. For example, the lead closer information may show a success rate for the closing representative. The success rate may be based on a total success rate, a success rate based on at least one demographic or other characteristic of the lead, a location of the lead, or the like.

The user interface 600 may also include a location information field 625. The closing representative may select the location information field 625 to input or view location information. The location information may include a location of the computing device 605. The location information field 625 may include a location of the lead.

The user interface 600 may also include a lead score information field 630, which may be configured to display a lead score. The lead score displayed in the lead score information field 630 may be unique to the closing representative operating the computing device 605. In some examples, the lead scoring manager may determine additional lead scores for additional closing representatives. The lead scoring manager may send the additional lead scores to the computing devices operated by the additional closing representatives. In some examples, the lead scoring manager may send the additional lead scores to the computing device 605, which may allow the closing representative to compare the additional lead scores with the lead score displayed in the lead score information field 630.

In some examples, the user interface 600 may also include additional fields not shown in FIG. 6. For example, the user interface 600 may include a lead score comparison field, which the closing representative may select to view the additional lead scores sent to the additional closing representatives. The closing representative may use the lead score comparison field to compare the lead score displayed in the lead score information field 630 with the additional lead scores. In some examples, the closing representative may determine another closing representative was sent a higher lead score than the lead score displayed in the lead score information field 630, and may determine not to follow up on the lead. In other examples, the closing representative may determine that the lead score displayed in the lead score information field 630 is higher than the additional lead scores, and may determine to follow up with the lead to increase a probability the lead will be successfully closed.

In some examples, the user interface 600 may include a map field for displaying a map. The map may identify the location of the lead, the location of the closing representative, locations of the other closing representatives, etc. In some examples, the map may also display the lead scores sent to the additional closing representatives, to allow the closing representative to compare the lead score displayed in the lead score information field 630 with the lead scores sent to the additional closing representatives.

In some examples, the user interface 600 may include a field the closing representative may select to accept or decline the lead associated with the lead score displayed in the lead score information field 630. If the closing representative accepts the lead, the closing representative may indicate to the provider that the closing representative will attempt to close the lead. If the closing representative declines the lead, the closing representative may indicate to the provider that the closing representative will not attempt to close the lead, or may delay attempting to close the lead.

Figure 7:
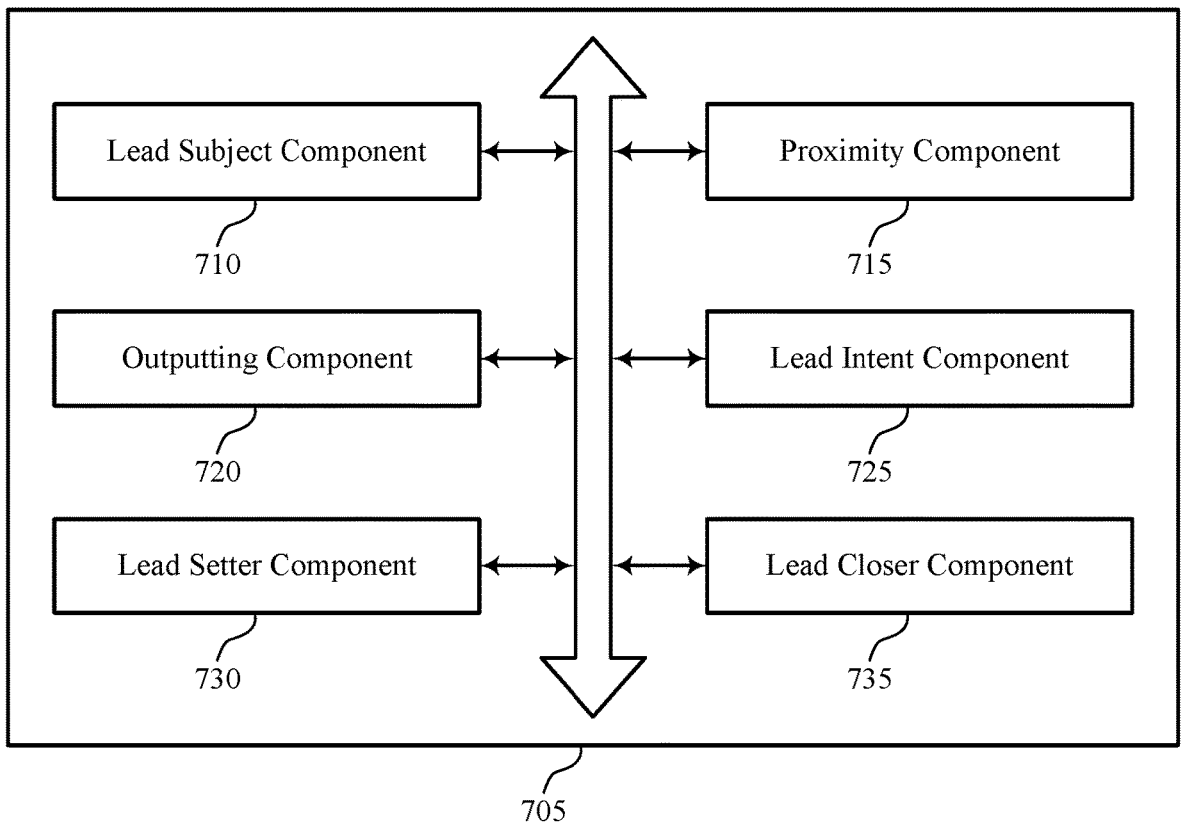
FIG. 7 illustrates a block diagram of a lead scoring manager that supports techniques for lead scoring in accordance with aspects of the present disclosure.

FIG. 7 shows a block diagram 700 of a lead scoring manager 705 that supports techniques for lead scoring in accordance with aspects of the present disclosure. The lead scoring manager 705 may be an example of aspects of a lead scoring manager 810 described herein. The lead scoring manager 705 may be part of a server, a setter device, a closer device, or a combination thereof. The lead scoring manager 705 may include a lead subject component 710, a proximity component 715, an outputting component 720, a lead intent component 725, a lead setter component 730, and a lead closer component 735. Each of these components, managers, or modules may communicate, directly or indirectly, with one another (e.g., via one or more buses).

The lead subject component 710 may identify a location of a person to receive a product or service based on an interaction between the person and a setting representative of the product or service. In some examples, the lead subject component 710 may determine a score associated with the person to receive the product or service based on information associated with the setting representative, information associated with the closing representative, and the proximity of the closing representative. In some examples, the lead subject component 710 may adjust a second score associated with the person using a third weighting factor. In some cases, the score is based on information associated with the person that includes information related to a demographic characteristic, a financial characteristic, a purchase history, a preference associated with the product or service, a consumer interest, personally identifying information, financial information, a use history of the product or service, contact information, a credit history, a qualification, or a combination thereof.

The proximity component 715 may determine a proximity of a closing representative to the person based on identifying the location of the person. In some examples, the proximity component 715 may determine a second proximity of the setting representative to the person, where identifying the location of the person is based on determining the second proximity of the setting representative with the person. In some examples, the proximity component 715 may receive, from the setting representative, at least one type of information indicating that the person is present with the setting representative.

In some examples, the proximity component 715 may identify a second location of the setting representative, where identifying the location of the person is based on the second location of the setting representative and receiving the information that the person is present with the setting representative. In some examples, the proximity component 715 may adjust the proximity using a second weighting factor. In some examples, the proximity component 715 may identify a subset of a set of representatives based on a proximity of each representative of the subset to the person, the subset including at least the closing representative. In some examples, the proximity component 715 may determine second scores for each representative in the subset based on the proximity of each representative in the subset to the person and information associated with each representative in the subset. In some examples, the proximity component 715 may compare the second scores to determine a highest second score of the second scores. In some examples, the proximity component 715 may select the closing representative from the subset based on the second score of the closing representative being the highest second score.

The outputting component 720 may output the score to a computing device. In some examples, the outputting component 720 may display the score on a display of the computing device.

The lead intent component 725 may weight information associated with the person received by the setting representative based on types of the information. In some examples, the lead intent component 725 may determine an intent score for the person based on weighting the information based on the types of the information, where the score is based on the intent score. In some examples, the lead intent component 725 may apply a first weighting factor to the first type of identifying information. In some examples, the lead intent component 725 may apply a second weighting factor to the second type of identifying information, where the second weighting factor is different than the first weighting factor. In some cases, the interaction between the person and the setting representative includes the setting representative identifying that the person is interested in the product or service.

The lead setter component 730 may determine a first score for the setting representative, where determining the score is based on determining the first score. In some examples, the lead setter component 730 may identify a number of leads set for the setting representative based on a lead-setting history of the setting representative. In some examples, the lead setter component 730 may identify a number of leads closed associated with the leads set for the setting representative based on the lead-setting history of the setting representative.

In some examples, the lead setter component 730 may determine a ratio of the number of leads set to the number of leads closed for the setting representative. In some examples, the lead setter component 730 may compare the ratio of the number of leads set to the number of leads closed for the setting representative with an average ratio, where the average ratio is a ratio of an average number of leads set to an average number of leads closed for a set of representatives, where determining the first score is further based on the comparison. In some examples, the lead setter component 730 may identify that a first subset of the lead-setting history includes a number of successful lead sets higher than a threshold number of successful lead sets, where determining the first score is further based on a success weighting factor. In some examples, the lead setter component 730 may adjust a first score associated with the setting representative using a first weighting factor. In some cases, the first score is increased if the ratio of the number of leads set to the number of leads closed for the setting representative is greater than the average ratio or decreased if the ratio of the number of leads set to the number of leads closed for the setting representative is less than the average ratio.

The lead closer component 735 may determine a lead-closed history of the closing representative, where determining the score is based on the lead-closed history.

Figure 8:
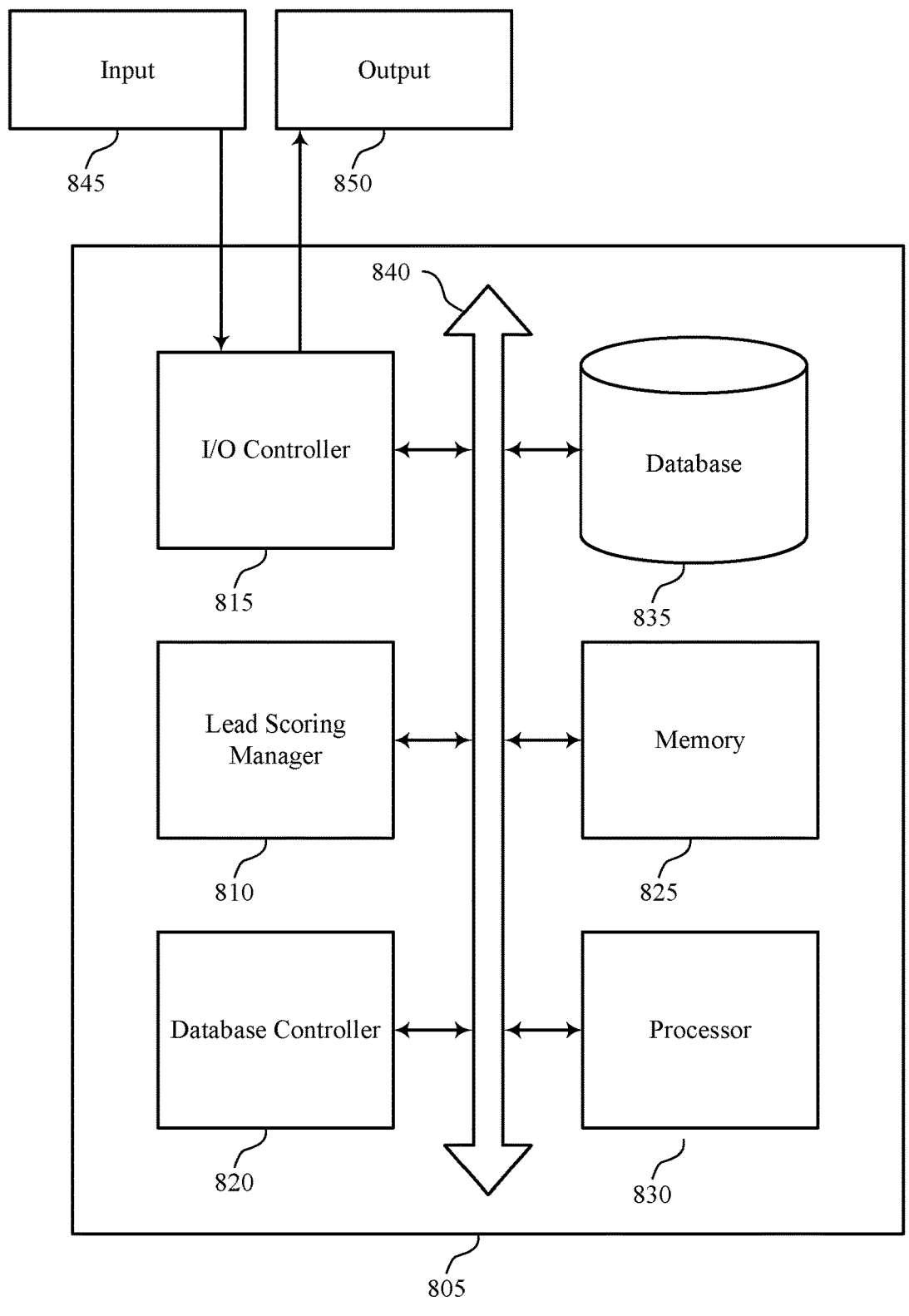
FIG. 8 illustrates a diagram of a system including a device that supports techniques for lead scoring in accordance with aspects of the present disclosure.

FIG. 8 shows a diagram of a system 800 including a device 805 that supports techniques for lead scoring in accordance with aspects of the present disclosure. The device 805 may be an example of a server, a setter device, a closer device, or a combination thereof as described herein. The device 805 may include components for bi-directional data communications including components for transmitting and receiving communications, including a lead scoring manager 810, an I/O controller 815, a database controller 820, memory 825, a processor 830, and a database 835. These components may be in electronic communication via one or more buses (e.g., bus 840).

The lead scoring manager 810 may be an example of a lead scoring manager 705 as described herein. For example, the lead scoring manager 810 may perform any of the methods or processes described above with reference to FIG. 7. In some cases, the lead scoring manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for lead scoring).

Figure 9:
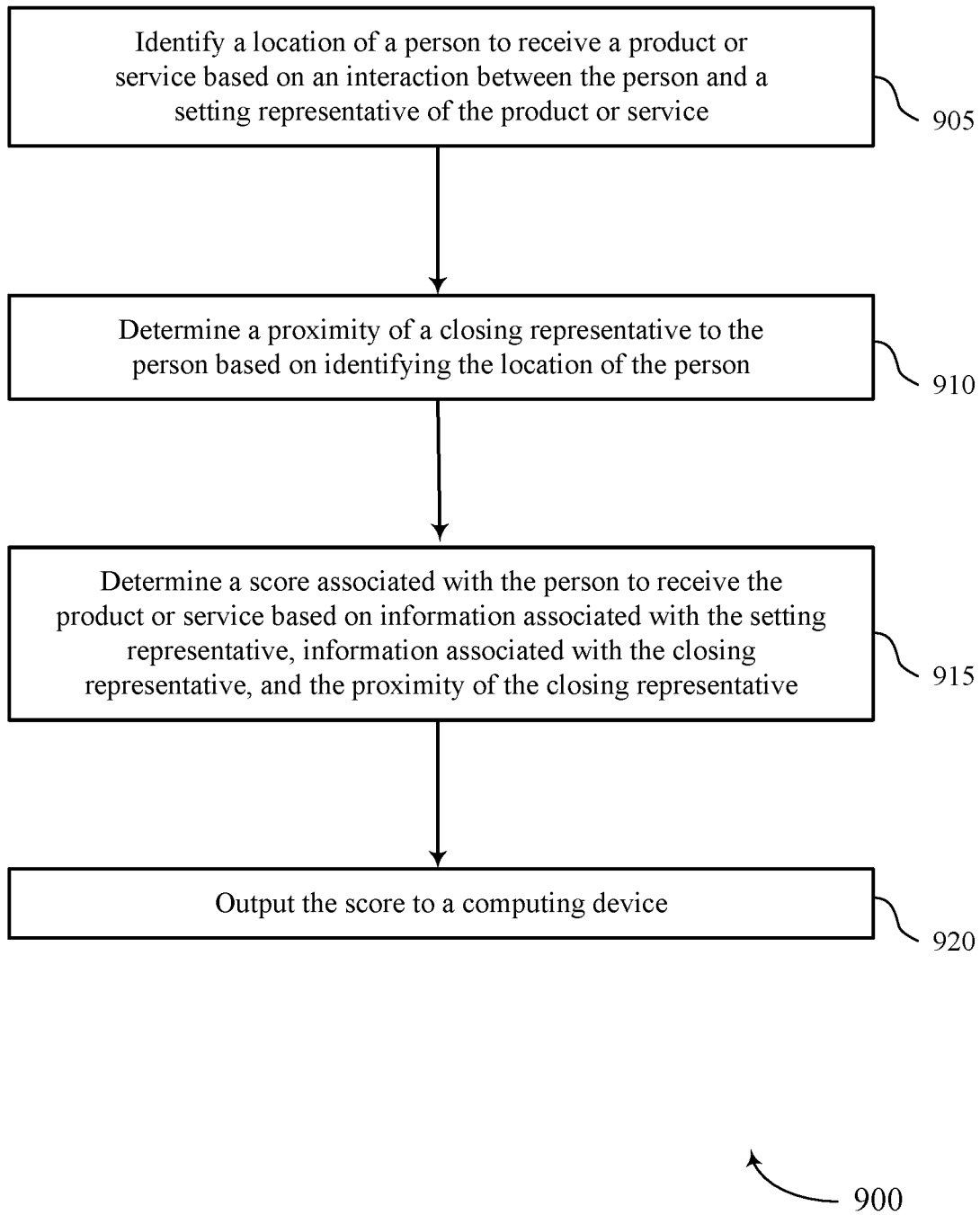
FIGS. 9 and 10 illustrate flowcharts of a method or methods that support techniques for lead scoring in accordance with aspects of the present disclosure.

FIG. 9 shows a flowchart illustrating a method 900 that supports techniques for lead scoring in accordance with aspects of the present disclosure. The operations of method 900 may be implemented by a lead scoring manager, one or more devices implementing a lead scoring manager, or various components as described herein. For example, the operations of method 900 may be performed by a device as described with reference to FIG. 8 that includes a lead scoring manager as described with reference to FIGS. 7 and 8. In some examples, a lead scoring manager may execute a set of instructions to control the functional elements of the lead scoring manager to perform the described functions. Additionally or alternatively, a lead scoring manager may perform aspects of the functions described below using special-purpose hardware.

At 905, the lead scoring manager may identify a location of a person to receive a product or service based on an interaction between the person and a setting representative of the product or service. The operations of 905 may be performed according to the methods described herein. In some examples, aspects of the operations of 905 may be performed by a lead subject component as described with reference to FIG. 7.

At 910, the lead scoring manager may determine a proximity of a closing representative to the person based on identifying the location of the person. The operations of 910 may be performed according to the methods described herein. In some examples, aspects of the operations of 910 may be performed by a proximity component as described with reference to FIG. 7.

At 915, the lead scoring manager may determine a score associated with the person to receive the product or service based on information associated with the setting representative, information associated with the closing representative, and the proximity of the closing representative. The operations of 915 may be performed according to the methods described herein. In some examples, aspects of the operations of 915 may be performed by a lead subject component as described with reference to FIG. 7.

At 920, the lead scoring manager may output the score to a computing device. The operations of 920 may be performed according to the methods described herein. In some examples, aspects of the operations of 920 may be performed by an outputting component as described with reference to FIG. 7.

Figure 10:
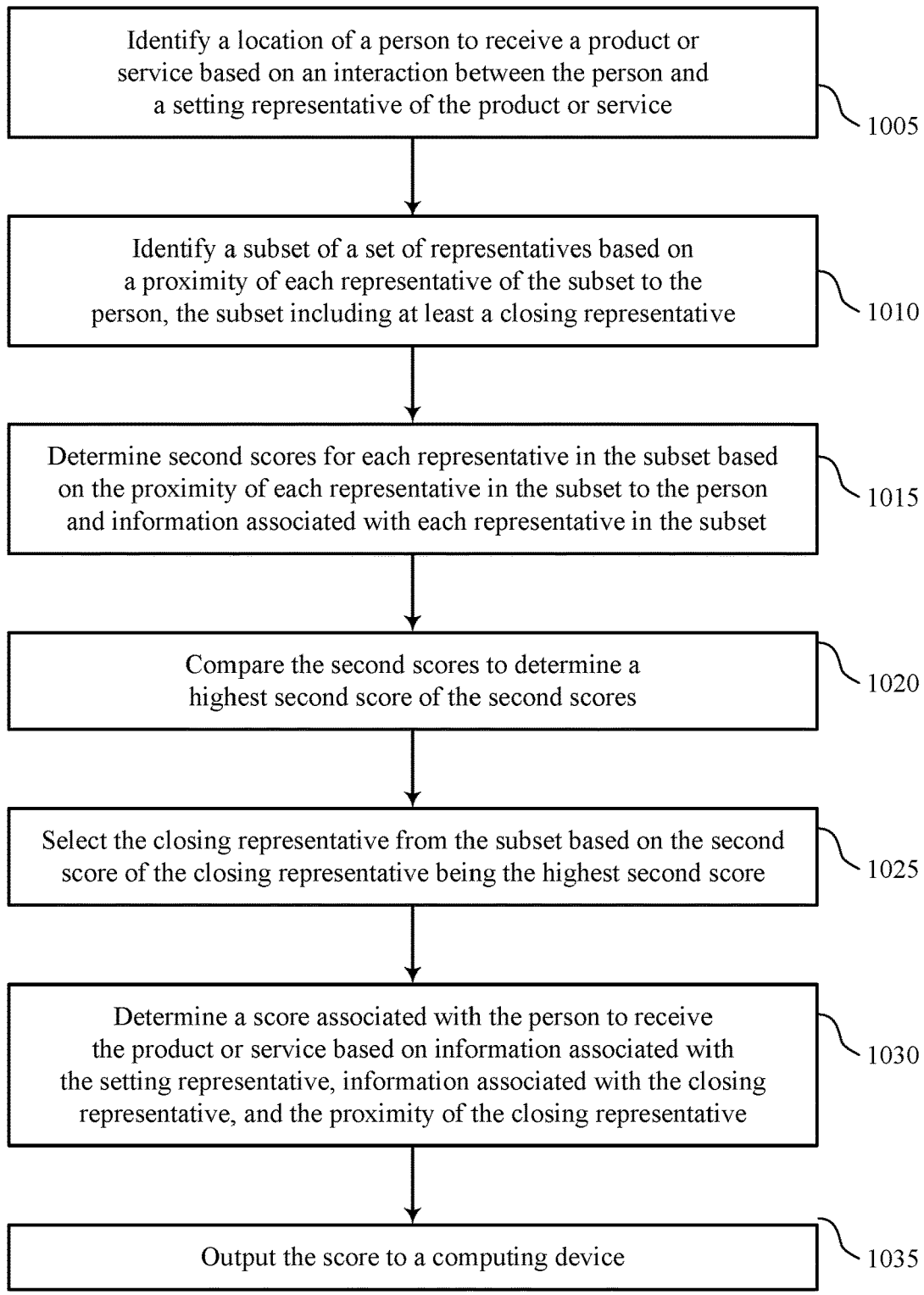

FIG. 10 shows a flowchart illustrating a method 1000 that supports techniques for lead scoring in accordance with aspects of the present disclosure. The operations of method 1000 may be implemented by a lead scoring manager, one or more devices implementing a lead scoring manager, or various components as described herein. For example, the operations of method 1000 may be performed by a device as described with reference to FIG. 8 that includes a lead scoring manager as described with reference to FIGS. 7 and 8. In some examples, a lead scoring manager may execute a set of instructions to control the functional elements of the lead scoring manager to perform the functions described below. Additionally or alternatively, a lead scoring manager may perform aspects of the functions described below using special-purpose hardware.

At 1005, the lead scoring manager may identify a location of a person to receive a product or service based on an interaction between the person and a setting representative of the product or service. The operations of 1005 may be performed according to the methods described herein. In some examples, aspects of the operations of 1005 may be performed by a lead subject component as described with reference to FIG. 7.

At 1010, the lead scoring manager may identify a subset of a set of representatives based on a proximity of each representative of the subset to the person, the subset including at least a closing representative. The operations of 1010 may be performed according to the methods described herein. In some examples, aspects of the operations of 1010 may be performed by a proximity component as described with reference to FIG. 7.

At 1015, the lead scoring manager may determine second scores for each representative in the subset based on the proximity of each representative in the subset to the person and information associated with each representative in the subset. The operations of 1015 may be performed according to the methods described herein. In some examples, aspects of the operations of 1015 may be performed by a proximity component as described with reference to FIG. 7.

At 1020, the lead scoring manager may compare the second scores to determine a highest second score of the second scores. The operations of 1020 may be performed according to the methods described herein. In some examples, aspects of the operations of 1020 may be performed by a proximity component as described with reference to FIG. 7.

At 1025, the lead scoring manager may select the closing representative from the subset based on the second score of the closing representative being the highest second score. The operations of 1025 may be performed according to the methods described herein. In some examples, aspects of the operations of 1025 may be performed by a proximity component as described with reference to FIG. 7.

At 1030, the lead scoring manager may determine a score associated with the person to receive the product or service based on information associated with the setting representative, information associated with the closing representative, and the proximity of the closing representative. The operations of 1030 may be performed according to the methods described herein. In some examples, aspects of the operations of 1030 may be performed by a lead subject component as described with reference to FIG. 7.

At 1035, the lead scoring manager may output the score to a computing device. The operations of 1035 may be performed according to the methods described herein. In some examples, aspects of the operations of 1035 may be performed by an outputting component as described with reference to FIG. 7.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of data processing at a database of a server, comprising:

receiving, from a first user device of a plurality of user devices configured to receive and request data regarding a potential customer from the database, location information of a customer person to receive a product or service based at least in part on an interaction between the customer and a setting representative of the product or service, wherein the server is configured to communicate with the plurality of user devices over a network;

transmitting, to the first user device for displaying on a user interface of the first user device, a graphical location of a plurality of closing representatives and a plurality of scores transmitted to one or more additional closing representatives based at least in part on receiving the location information;
receiving, by the server, from a plurality of user devices, a plurality of global positioning system (GPS) location information, each GPS location information of the plurality of GPS location information corresponding to a closing representative of the plurality of closing representatives and each GPS location information received from a user device of the plurality of user devices corresponding to the closing representative, wherein each closing representative is different from the setting representative;
determining, by the server, a relative proximity of each of the closing representatives to the customer based at least in part on the GPS location information of the customer and the GPS location information corresponding to the closing representative;
comparing, by the server, the GPS location information of the customer to the GPS location information of the closing representative;
determining, by the server, the plurality of scores, each score of the plurality of scores scene associated with one of the plurality of closing representatives and the customer to receive the product or service and determined based at least in part on a plurality of scoring dimensions, the plurality of scoring dimensions comprising information associated with the setting representative, information associated with the associated closing representative, and the proximity of the associated closing representative, wherein each score is indicative of a probability that the customer will buy the product from the associated closing representative and is specific to the associated closing representative, wherein determining each of the plurality of scores comprises:
adjusting a first score associated with the setting representative using a first weighting factor based at least in part on lead information input from at least one user interface of the plurality of user devices;
adjusting the proximity using a second weighting factor based at least in part on the lead information input from the at least one user interface of the plurality of user devices; and
adjusting a second score associated with the customer using a third weighting factor based at least in part on the lead information input from the at least one user interface of the plurality of user devices; and
outputting the plurality of scores to a user interface of the plurality of user devices, wherein each score of the plurality of scores is respectively output to a user interface of the user device of the associated closing representative, wherein outputting the plurality of scores comprises:
displaying each score of the plurality of scores on the user interface; and
receiving, by the server, an acceptance of a lead based at least in part on outputting the plurality of scores to the user interface of the plurality of user devices, wherein the acceptance is received based at least in part on an input from at least one user interface of the plurality of user devices.

2. The method of claim 1, wherein each score of the plurality of scores is based at least in part on information associated with the customer that comprises information related to a demographic characteristic, a financial characteristic, a purchase history, a preference associated with the product or service, a consumer interest, personally identifying information, financial information, a use history of the product or service, contact information, a credit history, a qualification, or a combination thereof.

3. The method of claim 1, wherein the interaction between the customer and the setting representative comprises the setting representative identifying that the customer is interested in the product or service.

4. The method of claim 1, further comprising:
determining a second proximity of the setting representative to the customer at a time of the interaction, wherein receiving the location information of the customer is based at least in part on determining the second proximity of the setting representative with the customer.

5. The method of claim 1, further comprising:
determining the first score for the setting representative, wherein determining the plurality of scores is based at least in part on determining the first score.

6. The method of claim 5, wherein determining the first score for the setting representative further comprises:
identifying a number of leads set for the setting representative based at least in part on a lead-setting history of the setting representative;
identifying a number of leads closed associated with the leads set for the setting representative based at least in part on the lead-setting history of the setting representative; and
determining a ratio of the number of leads set to the number of leads closed for the setting representative.

7. The method of claim 6, further comprising:
comparing the ratio of the number of leads set to the number of leads closed for the setting representative with an average ratio, wherein the average ratio is a ratio of an average number of leads set to an average number of leads closed for a plurality of setting representatives, wherein determining the first score is further based at least in part on the comparison.

8. The method of claim 6, further comprising:
identifying that a first subset of the lead-setting history includes a number of successful lead sets higher than a threshold number of successful lead sets, wherein determining the first is further based at least in part on a success weighting factor.

9. The method of claim 7, wherein the first score is increased if the ratio of the number of leads set to the number of leads closed for the setting representative is greater than the average ratio or decreased if the ratio of the number of leads set to the number of leads closed for the setting representative is less than the average ratio.

10. The method of claim 1, further comprising:
receiving, from the setting representative, at least one type of information indicating that the customer is present with the setting representative; and
receiving second location information of the setting representative, wherein receiving the location information of the customer is based at least in part on the second location information of the setting representative and receiving the information that the customer is present with the setting representative.

11. The method of claim 1, further comprising:
weighting information associated with the customer received by the setting representative based at least in part on types of the information; and
determining an intent score for the customer based at least in part on weighting the information based at least in part on the types of the information, wherein the score is based at least in part on the intent score.

12. The method of claim 11, wherein the types of the information includes a first type of identifying information and a second type of identifying information, wherein determining the intent score further comprises:
applying the first weighting factor to the first type of identifying information; and
applying the second weighting factor to the second type of identifying information, wherein the second weighting factor is different than the first weighting factor.

13. The method of claim 1, further comprising:
determining a lead-closed history of each of the plurality of closing representatives, wherein determining the plurality of scores is based at least in part on the lead-closed histories.

14. The method of claim 1, further comprising:
identifying a subset of the plurality of closing representatives based at least in part on the proximity of each closing representative of the subset to the customer;
determining second scores for each closing representative in the subset based at least in part on the proximity of each closing representative in the subset to the customer and information associated with each closing representative in the subset;
comparing the second scores to determine a highest second score of the second scores; and
selecting a closing representative from the subset based at least in part on the second score of the closing representative being the highest second score.

15. The method of claim 1, wherein outputting further comprises:
displaying the plurality of scores on displays of the plurality of user devices, wherein each score of the plurality of scores is respectively displayed the user device of the associated closing representative.

16. An apparatus, comprising:
a processor,
memory in electronic communication with the processor; and
instructions stored in the memory and executable by the processor to cause the apparatus to:
receive, from a first user device of a plurality of user devices configured to receive and request data regarding a potential customer from a database of a server, location information of a customer to receive a product or service based at least in part on an interaction between the customer and a setting representative of the product or service, wherein the server is configured to communicate with the plurality of user devices over a network;
transmit, to the first user device for displaying on a user interface of the first user device, a graphical location of a plurality of closing representatives and a plurality of scores transmitted to one or more additional closing representatives based at least in part on receiving the location information;
receive, by the server, from a plurality of user devices, a plurality of global positioning system (GPS) location information, each GPS location information of the plurality of GPS location information corresponding to a closing representative of the plurality of closing representatives and each GPS location information received from a user device of the plurality of user devices corresponding to the closing representative, wherein each closing representative is different from the setting representative;
determine, by the server, a relative proximity of each of the closing representatives to the customer based at least in part on the GPS location information of the customer and the GPS location information corresponding to the closing representative;
compare, by the server, the GPS location information of the customer to the GPS location information of the closing representative;
determine, by the server, the plurality of scores, each score of the plurality of scores associated with one of the plurality of closing representatives and the customer to receive the product or service and determined based at least in part on a plurality of scoring dimensions, the plurality of scoring dimensions comprising information associated with the setting representative, information associated with the associated closing representative, and the proximity of the associated closing representative, wherein each score is indicative of a probability that the customer will buy the product from the associated closing representative and is specific to the associated closing representative, wherein determining each of the plurality of scores comprises:
adjust a first score associated with the setting representative using a first weighting factor based at least in part on lead information input from at least one user interface of the plurality of user devices;
adjust the proximity using a second weighting factor based at least in part on the lead information input from the at least one user interface of the plurality of user devices; and
adjust a second score associated with the customer using a third weighting factor based at least in part on the lead information input from the at least one user interface of the plurality of user devices; and
output the plurality of scores to a user interface of the plurality of user devices, wherein each score of the plurality of scores is respectively output to a user interface of the user device of the associated closing representative, wherein outputting the plurality of scores comprises:
display each score of the plurality of scores on the user interface; and
receive, by the server, an acceptance of a lead based at least in part on outputting the plurality of scores to the user interface of the plurality of user devices, wherein the acceptance is received based at least in part on an input from at least one user interface of the plurality of user devices.

17. The apparatus of claim 16, wherein the instructions are further executable by the processor to cause the apparatus to:
identify a subset of the plurality of closing representatives based at least in part on the proximity of each closing representative of the subset to the customer;
determine second scores for each closing representative in the subset based at least in part on the proximity of each closing representative in the subset to the customer and information associated with each closing representative in the subset;
compare the second scores to determine a highest second score of the second scores; and
select a closing representative from the subset based at least in part on the second score of the closing representative being the highest second score.

18. A non-transitory computer-readable medium storing code, the code comprising instructions executable by a processor to:
receive, from a first user device of a plurality of user devices configured to receive and request data regarding a potential customer from a database of a server, location information of a customer to receive a product or service based at least in part on an interaction between the customer and a setting representative of the product or service, wherein the server is configured to communicate with the plurality of user devices over a network;

transmit, to the first user device for displaying on a user interface of the first user device, a graphical location of a plurality of closing representatives and a plurality of scores transmitted to one or more additional closing representatives based at least in part on receiving the location information;

receive, by the server, from a plurality of user devices, a plurality of global positioning system (GPS) location information, each GPS location information of the plurality of GPS location information corresponding to a closing representative of the plurality of closing representatives and each GPS location information received from a user device of the plurality of user devices corresponding to the closing representative, wherein each closing representative is different from the setting representative;

determine, by the server, a relative proximity of each of the closing representatives to the customer based at least in part on the GPS location information of the customer and the GPS location information corresponding to the closing representative;

compare, by the server, the GPS location information of the customer to the GPS location information of the closing representative;

determine, by the server, the plurality of scores, each score of the plurality of scores associated with one of the plurality of closing representatives and the customer to receive the product or service and determined based at least in part on a plurality of scoring dimensions, the plurality of scoring dimensions comprising information associated with the setting representative, information associated with the associated closing representative, and the proximity of the associated closing representative, wherein each is indicative of a probability that the customer will buy the product from the associated closing representative and is specific to the associated closing representative, wherein determining each of the plurality of scores comprises:
  adjust a first score associated with the setting representative using a first weighting factor based at least in part on lead information input from at least one user interface of the plurality of user devices;
  adjust the proximity using a second weighting factor based at least in part on the lead information input from the at least one user interface of the plurality of user devices; and
  adjust a second score associated with the customer using a third weighting factor based at least in part on the lead information input from the at least one user interface of the plurality of user devices; and output the plurality of scores to a user interface of the plurality of user devices, wherein each score of the plurality of scores is respectively output to a user interface of the user device of the associated closing representative, wherein outputting the plurality of scores comprises:
  display each score of the plurality of scores on the user interface; and
  receive, by the server, an acceptance of a lead based at least in part on outputting the plurality of scores to the user interface of the plurality of user devices, wherein the acceptance is received based at least in part on an input from at least one user interface of the plurality of user devices.

* * * * *